US009832497B2

(12) United States Patent
Stokking et al.

(10) Patent No.: US 9,832,497 B2
(45) Date of Patent: Nov. 28, 2017

(54) MARKER-BASED INTER-DESTINATION MEDIA SYNCHRONIZATION

(71) Applicants: Koninklijke KPN N.V., The Hague (NL); Nederlandse Organisatie voor Toegepast-Natuurwetenschappelijk Onderzoek TNO, Delft (NL)

(72) Inventors: Hans Maarten Stokking, Wateringen (NL); Ray Van Brandenburg, The Hague (NL); Mattijs Oskar Van Deventer, Leidschendam (NL)

(73) Assignees: Koninklijke KPN N.V., The Hague (NL); Nederlandse Organisatie Voor Toegepast-Natuurwetenschappelijk OnderZoek TNO, Delft (NL)

( * ) Notice: Subject to any disclaimer, the term of this patent is extended or adjusted under 35 U.S.C. 154(b) by 0 days.

(21) Appl. No.: 14/388,281

(22) PCT Filed: Mar. 29, 2013

(86) PCT No.: PCT/EP2013/056826
§ 371 (c)(1),
(2) Date: Sep. 26, 2014

(87) PCT Pub. No.: WO2013/144347
PCT Pub. Date: Oct. 3, 2013

(65) Prior Publication Data
US 2015/0052571 A1    Feb. 19, 2015

(30) Foreign Application Priority Data
Mar. 29, 2012   (EP) .................................. 12162241

(51) Int. Cl.
*H04N 21/242*    (2011.01)
*H04N 21/43*    (2011.01)
(Continued)

(52) U.S. Cl.
CPC ..... *H04N 21/242* (2013.01); *H04N 21/23418* (2013.01); *H04N 21/4302* (2013.01);
(Continued)

(58) Field of Classification Search
None
See application file for complete search history.

(56) References Cited

U.S. PATENT DOCUMENTS

2009/0006643 A1*   1/2009   Lee .................. H04N 21/23424
                                                                                                                        709/231
2012/0030723 A1*   2/2012   Baum ............. H04N 21/234327
                                                                                                                         725/105
(Continued)

FOREIGN PATENT DOCUMENTS

WO           99/44363 A1      9/1999
WO      2011/092244 A1     8/2011
WO   WO 2011/092244 A1 *   8/2011         H04L 29/06

OTHER PUBLICATIONS

"Telecommunications and Internet Converged Services and Protocols for Advanced Networking (TISPAN); IPTV Architecture; IPTV Functions Supported by the IMS Subsystem", ETSI TS 182 027 V3.5.1, Mar. 2011, pp. 1-195.
(Continued)

*Primary Examiner* — Michael Telan
(74) *Attorney, Agent, or Firm* — McDonnell Boehnen Hulbert & Berghoff LLP

(57) ABSTRACT

A method and a system enabling inter-destination synchronization of processing of content of at least a first and second media stream, wherein said first and second media stream are associated with one or more markers for marking one or more content parts of said first and second media streams respectively. The method comprises the steps of: detecting a first marked content part in said first media stream and a second marked content part in said second media stream,
(Continued)

said first and second market content part being associated with a first and second marker respectively; associating first timing information, preferably comprising a first clock time, with said detected first marked content part and associating second timing information, preferably comprising a second clock time, with said detected second marked content part; determining a timing difference on the basis of said first and second timing information; and, generating on the basis of said timing difference synchronization information for enabling a first and/or second synchronization client to adjust the processing of said first and/or second media stream respectively.

18 Claims, 20 Drawing Sheets

(51) Int. Cl.

| | |
|---|---|
| *H04N 21/637* | (2011.01) |
| *H04N 21/6437* | (2011.01) |
| *H04N 21/8547* | (2011.01) |
| *H04N 21/234* | (2011.01) |
| *H04N 21/435* | (2011.01) |

(52) U.S. Cl.
CPC ......... *H04N 21/435* (2013.01); *H04N 21/637* (2013.01); *H04N 21/6437* (2013.01); *H04N 21/8547* (2013.01)

(56) References Cited

U.S. PATENT DOCUMENTS

| | | | |
|---|---|---|---|
| 2012/0144435 A1* | 6/2012 | Spilo ................ | H04N 5/76 725/78 |
| 2012/0151009 A1* | 6/2012 | Bouazizi ............ | H04L 41/5067 709/219 |

OTHER PUBLICATIONS

"Telecommunications and Internet Converged Services and Protocols for Advanced Networking (TISPAN); IMS-Based IPTV Stage 3 Specification", ETSI TS 183 063 V3.5.2, Mar. 2011, pp. 1-239.

Vaishnavi, Ishan et al., "From IPTV to Synchronous Shared Experiences Challenges in Design: Distributed Media Synchronization", Signal Processing: Image Communication, vol. 26, Mar. 29, 2011, pp. 370-377.

Boronat, Fernando et al., "Multimedia Group and Inter-Stream Synchronization Techniques: A Comparative Study", Information Systems, vol. 34, 2009, pp. 108-131.

"Digital Video Broadcasting (DVB); Specification for the Carriage of Synchronized Auxiliary Data in DVB Transport Streams", ETSI TS 102 823 V1.1.1., Nov. 2005, pp. 1-37.

Schulzrinne, H. et al., "Real Time Streaming Protocol (RTSP)", Network Working Group, Request for Comments 2326, Apr. 1998, pp. 1-81.

Schulzrinne, H. et al., "RTP: A Transport Protocol for Real-Time Applications", Network Working Group, Request for Comments 3550, Jul. 2003, pp. 1-92.

Friedman, T. et al., "RTP Control Protocol Extended Reports (RTCP XR)", Network Working Group, Request for Comments 3611, Nov. 2003, pp. 1-55.

Cox, Ingemar J. et al., "Digital Watermarking and Steganography", Morgan Kaufman, 2nd Edition, ISBN 978-0-12-372585-1, 2008.

PCT International Search Report and Written Opinion, PCT International Application No. PCT/EP2013/056826 dated Jun. 18, 2013.

Yuang, Maria C. et al., "A Synchronization Paradigm With QoS Guarantees for Multimedia Communications", 1999 IEEE Global Telecommunications Conference, Globecom'99, Dec. 5-9, 1999, pp. 214-220.

Stokking, H.M. et al., "IPTV Inter-Destination Synchronization: A Network-Based Approach", Intelligence in Next Generation Networks (ICIN), 2010 14th International Conference, Oct. 11, 2010, pp. 1-6.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P| Resrv  |   PT=XR=207   |              length             |
+-+-+-+-+-+-+-+-+-+-+-+-+-+-+-+-+-+-+-+-+-+-+-+-+-+-+-+-+-+-+-+-+
|                       SSRC of packet sender                   |
+=+=+=+=+=+=+=+=+=+=+=+=+=+=+=+=+=+=+=+=+=+=+=+=+=+=+=+=+=+=+=+=+
|   BT=TBD     | type of marker|        block length=1          |
+-+-+-+-+-+-+-+-+-+-+-+-+-+-+-+-+-+-+-+-+-+-+-+-+-+-+-+-+-+-+-+-+
|                         marker number                         |
+-+-+-+-+-+-+-+-+-+-+-+-+-+-+-+-+-+-+-+-+-+-+-+-+-+-+-+-+-+-+-+-+
```

FIG. 11

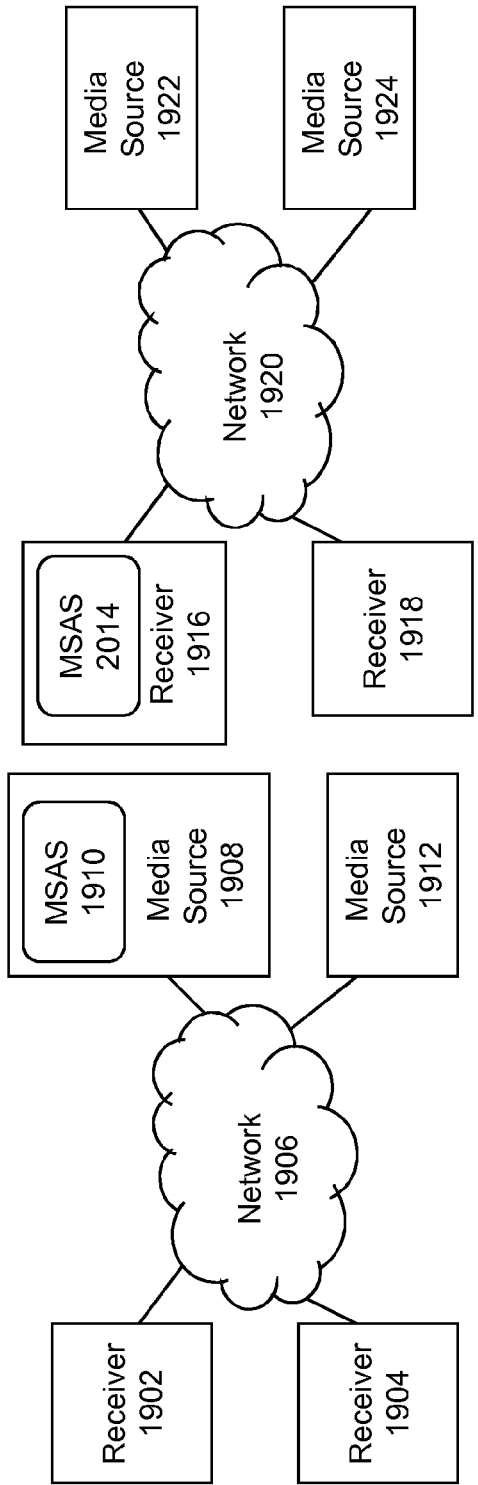
FIG. 19B
FIG. 19A
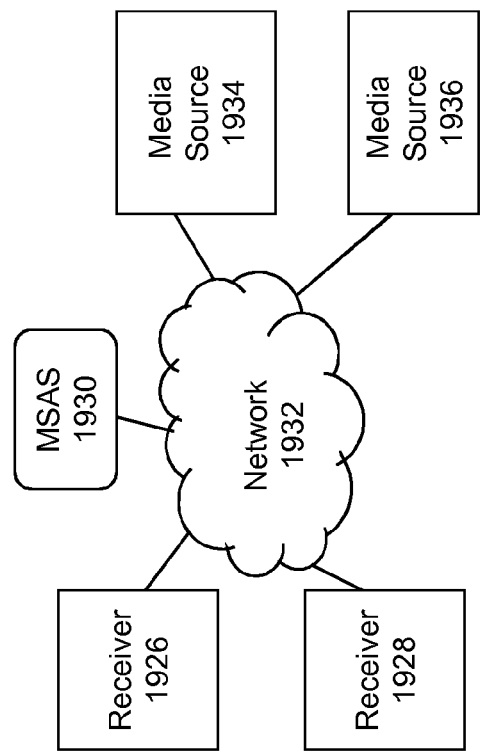
FIG. 19C

MARKER-BASED INTER-DESTINATION MEDIA SYNCHRONIZATION

CROSS-REFERENCE TO RELATED APPLICATIONS

This application is a U.S. national stage of International Application No. PCT/EP2013/056826, titled "Marker-Based Inter-Destination Media Synchronization" and filed Mar. 29, 2013, which claims priority to European Patent Application No. 12162241.9, titled "Marker-Based Inter-Destination Media Synchronization" and filed Mar. 29, 2012, each of which is incorporated by reference herein in its entirety.

FIELD OF THE INVENTION

The disclosure generally relates to marker-based inter-destination media synchronization and, in particular, though not exclusively, to a method for enabling inter-destination synchronization of media streams, a device comprising a synchronization function, a device comprising a synchronization client and a data structure for use in such systems and computer program product using such methods.

BACKGROUND OF THE INVENTION

Multi-media techniques such as Voice over IP (VoIP) and Internet Protocol Television (IPTV) enable a large range of multi-media services. One type of multi-media service includes providing a synchronized shared experience for a plurality of users. Such synchronized multi-media services may be provided to a plurality of users, which are located at different locations. For example, a group of users may separately watch the same television channel and communicate with each other using text, audio and/or video (e.g., social TV). Other examples include timing-sensitive interactive experiences, such as a live auction, or a broadcasted television quiz program wherein viewers at home may input answers to broadcasted questions and participate in the show. Further, synchronized multi-media services may be provided to a plurality of different devices associated with one user. For example, a user may wish to watch the same television program on a handheld device in synchronization with a television at home, such that a user may switch from one device to another seamlessly back and forth.

In order to deliver content to different users, a content source may transmit streams via the network to a plurality of receivers for play-out. Due to, e.g., different end-to-end delays (due to different transmission delays, network delays and/or different content processing times at different receivers), a so-called Inter-Destination Media Synchronization (IDMS) or group synchronization system is used to keep the play-out of the streams by the different receivers in sync. Examples of known IDMS systems are described in ETSI TISPAN documents TS 182 027 and 183 063, an article by I. Vaishnavi et al. "From IPTV to shared experiences challenges in design: Distributed media synchronization" (Elsevier Signal Processing: Image Communication 26 (2011) pp. 370-377) and an article by F. Boronat et al. "Multimedia group and inter-stream synchronization techniques: A comparative study" (Elsevier Information Systems 34 (2009) 108-131).

An IDMS system typically comprises a synchronization client at the receiver and a synchronization server in the network wherein the synchronization client is configured to transmit timing information, e.g. one or more clock times indicating the time at which a particular packet in a stream was processed (e.g. received, decoded or played-out) by a receiver, to the synchronization server. On the basis of the timing information, the synchronization server is able to determine synchronization information, i.e. information for a receiver, or a synchronization client therein, to delay or advance play-out of a stream. The synchronization information is transmitted to the receivers so that inter-destination synchronization of the receivers may be achieved.

Conventional IDMS systems are typically described in the context of simple, well-defined content delivery systems, e.g. a single content source transmitting a single stream, which is multi-casted to a plurality of receivers using one streaming protocol, e.g. the RTP/RTCP protocol. In such system, a particular content part, i.e. (part of) an image frame and/or one or more audio samples, is transmitted to the receivers on the basis of RTP packets having the same RTP time stamp. So in such a system RTP packets received by different receivers, but with the same time stamp relate to the same content part (e.g. the same video frame). Therefore, timing differences associated with the processing of the same content part by different receivers can be relatively easily determined.

In many content delivery systems however, such information for a straightforward determination of such timing differences is not available. For example, content may be delivered to different receivers using different protocols (e.g. a multicast RTP stream and an HTTP adaptive steaming (HAS) protocol), different compression formats, codecs, etc. Moreover, when streaming content to receivers, the stream may be transcoded differently for different receivers or the content may be modified (by adding e.g. an advertisement to it), depending on the receiving end. Such modifications of one or more of the streams often leads to the disappearance of a common time line amongst the streams, which however formed the basis for the synchronization determinations by the conventional IDMS systems.

Further, content may be delivered by multiple sources. For example, a content delivery network (CDN) may use various different delivery nodes (media server) for delivering a media broadcast to a plurality of receivers. In such case, a first RTP stream delivered from a first delivery node will have a random initial RTP timestamp value (random RTP timestamp Offset), which differs from a random initial RTP timestamp value from a second RTP stream delivered from a second deliver node, although the content and the moment that the content is transmitted may be the same for both nodes. In such case RTP packets having the same RTP time stamp, but are transmitted by different delivery nodes, no longer correspond to the same content part of a content stream.

In all of the above cases, a conventional IDMS system is no longer able to determine the information required for synchronization of the play-out. Hence, there is a need in the art for an improved inter-destination media synchronization solution that alleviates at least one of the problems discussed above.

SUMMARY OF THE INVENTION

It is an objective of the invention to reduce or eliminate at least one of the drawbacks known in the prior art. In a first aspect the invention may relate to a method for enabling inter-destination synchronization of processing, preferably the play-out of content of at least a first and a second media stream. Said first and/or second media stream may be associated with one or more markers for marking one or more content parts of (e.g. in) said first and/or second media stream respectively.

In one embodiment, the method may comprise: detecting a first marked content part of (in) said first media stream and a second marked content part of (in) said second media stream, wherein said first and second marked content part may be associated with a first and second marker respectively; associating first timing information, preferably comprising a first clock time, with said detected first marked content part and associating second timing information, preferably comprising a second clock time, with said detected second marked content part; determining a timing difference on the basis of said first and second timing information; and, generating on the basis of said timing difference synchronization information for enabling a first and/or second device, preferably a receiver, comprising a synchronization client to adjust processing, preferably the play-out, of said first and/or second media stream by said first and/or second device respectively.

In an embodiment said first and second marker may be the same and/or relate to the same position on a content time-line common to the first and second media stream. In further embodiments the first and second media stream comprise different content and/or have a content time-line in common (also referred to as a common content time-line). Such common content-time line may reflect, either in absolute times or as relative positions, when a content part of a (content) stream is to be processed (e.g. played-out) relative to other content parts sharing the same common content-time line.

In contrast with a conventional IDMS system, the marker-based IDMS according to the invention allows inter-destination synchronization of a plurality of receivers wherein the same content may be streamed from different sources, using different formats and/or on the basis of different protocols to a plurality of receivers. For instance, two receivers, e.g. a television receiver, for instance a HbbTV (Hybrid Broadband Broadcast Television) enabled television, and a mobile device may receive marked content associated with the same linear program (e.g., a television broadcast), via two different streaming protocols, e.g. a multicasted stream based on the RTP protocol or for example based on a DVB (-T, -C or -H type) compatible protocol, and another stream based on the HTTP Adaptive Streaming (HAS) protocol.

In another embodiment, the method may comprise: a device, preferably a receiver, comprising a synchronization client, said synchronization client configured for receiving a marked media (content) stream, detecting a marked content part of said marked media stream, wherein said marked content part being associated with a marker; associating timing information, preferably comprising a clock time and/or a marker identifier, with said detected marked content part; a device, preferably a server, comprising a synchronization function, determining a timing difference on the basis of said first timing information and on the basis of second timing information associated with an unmarked second media stream; and, generating on the basis of said timing difference synchronization information for enabling said synchronization client to adjust processing, preferably play-out, preferably of said content, of said first media stream. Hence, the method may also be used when synchronizing a marked media stream and an unmarked media stream. In that case, timing information associated with detected marked content parts may be related to sequence information associated with an unmarked content stream, e.g. an RTP media stream.

In an embodiment of a method according to the invention, said one or more markers may comprise a marker identifier for identifying said one or more markers associated with said marked content parts of said first and second media stream, wherein said method may further comprise: comparing a first marker identifier associated with said first marked content part with a second marker identifier associated with said second marked content part. In a further embodiment said method may comprise: if said first marker identifier is identical to said second marker identifier, determining a timing difference on the basis of said first and second timing information; and/or, if said first marker identifier is not identical to said second marker identifier, determining a timing difference on the basis of said first and second timing information and a temporal relation between said first marker identified by said first marker identifier and said second marker identified by said second marker identifier.

Hence, if a first device (e.g. a first receiver) comprising a first synchronization client transmits as timing information not only a first clock time associated with a first marker, but also a marker identifier, and a second device (e.g. receiver) transmits not only a second clock time associated with a second marker, but also the second marker identifier to the synchronization function (e.g. to the device comprising such synchronization function), said synchronization function may determine whether the clock times relate to the same marker (and hence relate to the same content part, or alternatively in case of different content/media streams relate to the same position on a content time common to said different content/media streams) or not.

If these clock times relate to different markers, the synchronization function may take this into account when calculating the synchronization information. In an embodiment said synchronization function is provided with information about the distance on the content time line common to the streams, between all, or only the relevant markers of the media stream. Such distance may for instance be provided in any suitable time unit. Alternatively such distance may be provided using other units, indicating a separation degree, such as for instance the number of packets.

In an embodiment the method may comprise: a first receiver for receiving the first media stream comprising a first synchronization client providing said first timing information; and, in a second receiver for receiving the second media stream comprising a second synchronization client, providing said second timing information respectively to a synchronization function. In embodiments of the invention said synchronization function may be implemented in a device, preferably one of: a synchronization server, a content source adapted for transmitting said first and/or said second media stream to said first and second synchronization client; or, a receiver associated with, preferably comprising said first and/or second synchronization client.

In an embodiment the method may comprise: a device, preferably a receiver comprising said first synchronization client transmitting said first timing information to a device comprising said synchronization function, preferably said first timing information comprising a first marker identifier identifying said first marker; transmitting a request for said second timing information to said second synchronization client, preferably said request comprising said first marker identifier; in response to said request, said second synchronization client transmitting said second timing information to said synchronization function. Hence, in this embodiment, timing information is provided to the synchronization function in a request-response scheme.

In an embodiment the method may comprise: upon detection of said first marked content part, generating a first clock time on the basis of a synchronized clock; upon detection of said second marker, generating a second clock time on the basis of said synchronized clock; and, optionally, transmitting said first and/or second clock time to said synchronization function. An NTP synchronized clock or any other suitable synchronization scheme for synchronizing clocks may be used.

In an embodiment said method may comprise: a device, preferably a receiver, for receiving said first media stream, said device comprising a first synchronization client, transmitting a first marker notification associated with said detected first marked content part to a device comprising a synchronization function, preferably said first marker notification comprising a first marker identifier; said synchronization function generating said first timing information, preferably a first clock-time, upon receipt of said first marker notification.

This way, the synchronization client does not need to timestamp a marker notification message before it is sent to the synchronization function. In embodiments the first clock-time (e.g. timing information) may be the arrival-time of said marker notification at the synchronization function, or alternatively the first clock-time may be derived from it. The chosen implementation is situation dependent, such as the required level of synchronization (e.g. loose or tight synchronization), and/or knowledge of transmission delays of timing information transmitted by the synchronization client to the synchronization function In an embodiment a marker comprises a flag and/or a marker identifier. A marker identifier may be used to identify different markers associated with different marked content parts, whereby said different marked content parts relate to different positions on a content time line common to said first and second media stream. In another embodiment said flag or marker identifier may be carried in a header of a transport container carrying a content part. In another embodiment said marker, optionally comprising a flag or marker identifier, may be inserted as a watermark in said content part. Hence, content parts may be marked at any level in the protocol stack and also at content-level so that inter-destination synchronization may be achieved even when the content is transcoded somewhere in the path between the transmitter (content source) and the receiver.

In a further embodiment said first and/or second media stream is a MPEG Transport Stream, preferably for use in a DVB service. In this embodiment the marker identifier according to the invention may be (may have the format of) a synchronised_event_id_instance (field), a synchronised_event_id (field), a synchronised_event_context (field) or any combination of these known fields in the art (e.g. known from the ETSI TS 102 823 standard). In an embodiment of such a combination, the synchronised-event_id (field) may for example be used to indicate that the synchronised_event_id_instance is to be interpreted as a marker identifier for use according to the invention. Different values of the synchronised_event_id_instance may then relate to different content parts, and/or to different positions on a content time line common to the first and second stream.

Both the data (bits) associated with the synchronised_event_id, synchronised_event_id_instance, and the synchronised_event_context may be carried by a Packetized Elementary Stream (PES) packet. The PES packet carrying the marker identifier may comprise a Presentation Time Stamp (PTS), which may be used to identify a particular content part (e.g. a video frame) of the Transport Stream, (e.g. the first and/or second stream according to the invention), which content part may be carried by one or more packets having the same Presentation Time Stamp. Hence a PES packet carrying a marker identifier may thus also contain an (implicit) instruction for a terminal receiving the MPEG Transport Stream, to detect the content part associated with the marker (identifier) and to provide associated timing information (or a marker notification) according to embodiments of the method according to the invention, to the synchronization function, In this manner the synchronization (Inter-Destination Media Synchronization or IDMS) of processing (for example play-out) of (MPEG) Transport Streams, preferably associated with a DVB broadcast or multicast, received by different receivers, but carrying the same (linear) content program, may be efficiently achieved, by re-using existing and standardized dataformats in embodiments of the method according to the invention.

In further embodiments wherein the first and/or second stream is a MPEG Transport Stream, instead of using the above defined standardized fields of the synchronised event descriptor as a marker (marker identifier), all or part of the known broadcast timeline descriptor, further described in ETSI TS 102 823, may be used for this purpose. The broadcast timeline descriptor may be part of a synchronized auxiliary data stream in a Transport Stream. The auxiliary data stream may be an elementary stream carrying auxiliary data which is synchronized with one or more elementary streams carrying video or audio, and being part of the same Transport Stream. In embodiments the absolute_ticks or offset_ticks field of the broadcast_timeline descriptor (instance) may be used as a marker identifier according to the invention. Further examples of fields of the broadcast_timeline_descriptor that may be suitable for use as marker identifier may be the broadcast_timeline_id, or the broadcast_timeline_type, or a combination of the both. In further embodiments the marker identifier may be any combination of the above referred to fields of the broadcast_timeline_descriptor. In a further embodiment a new field is defined within the broadcast_timeline_descriptor (instance) that may be used as (part of) a marker, preferably a marker identifier.

In an embodiment said one or more markers, preferably marker identifiers, may be transmitted in one or more signaling messages associated with one said first and/or second media stream. In such an embodiment a content part of a media stream is not directly marked (as is the case with watermarking the content part, or as is the case when inserting a marker at protocol level in the header or container of a protocol packet), but indirectly through the use of signaling messages. The signaling messages provide the information of which content part timing information may be determined. A content part that is (indirectly) referenced/indicated through the use of markers, preferably marker identifiers within such signaling messages, may thus also be referred to as a marked content part for the purpose of this invention.

In a further embodiment according to the invention, said one or more signaling messages may comprise one or more RTCP or SIP messages. In yet another embodiment, said one or more signaling messages may comprise one or more RCTP messages comprising an RTCP XR block.

In an embodiment, said one or more signaling messages may comprise an RTP timestamp and/or an NTP timestamp and, optionally a marker identifier.

In yet a further embodiment, said one or more signaling messages may comprise information regarding values of the absolute_ticks or offset_ticks field, optionally as discrete values or in the form of a function (algorithm) through which values of ticks may be derived, wherein said values may serve as markers, preferably marker identifiers according to the invention. In all of the above examples related to the use of signalling messages, the marking is performed indirectly, wherein parts or all of the content of such signalling message, including separate parameters, values or fields or combinations of those, may be used as a marker, preferably a marker identifier, for marking a content part. Thus the information carried in such signalling messages provides for the association of markers with content parts of a first and/or second stream. The thus associated content parts are also referred to as marked content parts.

In yet further embodiments a function (e.g. an algorithm) may be provided to the synchronization client implemented on the receiver, said function arranged for providing markers, preferably marker identifiers, said markers being associated with content parts. Said function may for instance be provided as part of auxiliary data of the first and/or second media stream, for instance as an auxiliary data stream of a Transport Stream. Alternatively such function may be provided in a manifest file or a signalling message. Such function may provide for values of datafields, which datafields are present in the first and/or second stream (or in an auxiliary stream already synchronized with said first and/or second stream), wherein said values may serve as markers, preferably marker identifiers according to the invention. Such function thus indirectly marks content parts according to the invention. Through such function (algorithm) inherently markers are associated with content parts of media streams. The associated content parts are also referred to as marked content parts, such marked content parts thus being associated with markers. It is however understood that for detecting such marked content parts (wherein the marking is provided by a function (algorithm)), such function is to be executed, preferably at a device comprising a synchronization client arranged for executing such function. Such device may for instance be a receiver (e.g. television set, smartphone, tablet, set-top box or any other device implemented with the functionality of the synchronization client).

In an embodiment, said first and/or second marked content part may be (at least part of) an individually identifiable data unit, including: part of a video frame, a plurality of video frames, RTP packet, a segment, a transport packet, one or more audio samples and/or one or more text subtitle frames. In an embodiment, said first and second timing information may comprise a clock time at which a (marked) content part is processed by a first or second receiver associated with said first or second synchronization client respectively, preferably said clock time being associated with a reception time, a depacketizing time, a decoding time or a play-out time.

In an embodiment said first and/or second marked content part may be a first and second segment of first and second segmented media stream respectively, wherein said segments may be identified in a data structure, preferably a manifest file, by a segment identifier. In another embodiment, said data structure, preferably a manifest file, may further comprise location information, preferably URLs, associated with said segment identifiers for locating one or more media servers configured to transmit segments identified by said segment identifiers, and, marker information, preferably a marker, optionally a marker identifier for marking one or more segment identifiers in said data structure, and, optionally, a timing parameter indicating at what time timing information, preferably including part or all of said marker information should be transmitted to a synchronization function.

In another aspect, the invention may relate to a device, preferably a receiver, comprising a synchronization client, preferably an inter-destination synchronization client, configured to receive at least a media stream associated with at least one marker for marking a content part of said media stream, wherein said client may be configured for: detecting at least one marked content part of said media stream; providing a device comprising a synchronization function with timing information associated with said detected first marker, preferably said timing information comprising a first clock time and/or a marker identifier; receiving synchronization information for instructing said synchronization client to adjust the timing of a processing step, preferably the play-out of said media stream.

In yet another aspect, the invention may relate to a device, preferably a server, receiver, or a content source device, comprising a synchronization function wherein said synchronization function may be configured for: receiving or providing first timing information, preferably a first clock time, associated with a first device, preferably a first receiver, comprising a first synchronization client, said first timing information being associated with a first marked content part of (in) a first media stream, said first media stream being received by said first device; receiving or providing second timing information, preferably a second clock time, associated with a second device, preferably a second receiver, comprising a second synchronization client, said second timing information being associated with a second marked content part (of) in a second media stream, said second media stream being received by said second device; determining a timing difference based on said first and second timing information; and, generating on the basis of said timing difference synchronization information for instructing said first and/or second synchronization client to adjust the timing of a processing step of said received media stream, preferably to adjust the play-out of said received media stream by said first and/or second device.

In a further aspect, the invention may relate to a system for enabling inter-destination synchronization of processing, preferably play-out, of content, wherein said system may comprise: a first device, preferably a first receiver, comprising a first synchronization client for detecting a first marked content part of a first media stream and for associating said first marked content part with first timing information; a second device, preferably a second receiver, comprising a second synchronization client for detecting a second marked content part of a second media stream and for associating said second marked content with second timing information; a third device, preferably one of a server, receiver or content source device, comprising a synchronization function configured for determining a timing difference based on said first timing information and second timing information; and for generating on the basis of said timing difference synchronization information, preferably synchronization settings or instructions, for said first and/or second synchronization client to adjust processing, preferably play-out, of said first or second media stream respectively.

In yet a further aspect, the invention may relate to a data structure for use in a system as described above, wherein said data structure may be used for reporting the detection of a marked content part (e.g. a content part marked by a marker) in a media stream to a device comprising a synchronization function according to the invention. Said data structure may comprise: timing information, preferably a clock time, associated with a marked content part in said media stream; and, optionally, said timing information comprising a marker identifier for identifying said marker. In an aspect the invention may relate to a computer-readable storage medium comprising said data structure.

In an aspect, the invention may relate to a further data structure, preferably a manifest file, for use in a system as described above, wherein said data structure, preferably a manifest file, may comprise: one or more segment identifiers and location information, preferably URLs, associated with said segment identifiers for locating one or more media servers configured to deliver one or more segments associated with said one or more segment identifiers; and, marker information comprising one or more markers for marking one or more segment identifiers in said data structure, and, optionally, a timing parameter indicating at what time timing information should be transmitted to a device comprising a synchronization function according to the invention.

In an aspect the invention may relate to a computer-readable storage medium comprising said data structure.

The invention may further relate to a computer program product, implemented on computer-readable non-transitory storage medium, wherein the computer program product may be configured for, when run on a computer, executing the method steps as described above.

The disclosed embodiments will be further illustrated with reference to the attached drawings, which schematically show embodiments according to the invention. It will be understood that the invention is not in any way restricted to these specific embodiments.

BRIEF DESCRIPTION OF THE DRAWINGS

Aspects of the invention will be explained in greater detail by reference to exemplary embodiments shown in the drawings, in which:

FIG. 11 shows another exemplary synchronization marker used in RTCP (Real-time Control Transport Protocol), according to one embodiment of the invention;

FIG. 19A-C show illustrative variations of an IDMS system, according to one embodiment of the invention.

DETAILED DESCRIPTION

It is to be understood that for the purpose of this invention, the term 'device' relates to a hardware structure. This may for instance be an end-terminal (such as a television, set-top box, tablet, handset, smartphone), alternatively an apparatus in a network, yet alternatively an intermediary product, such as a chipset, System on Chip, Wireless Module, Microprocessor, SIM, or USIM card. Relevant is that such a device may comprise a synchronization client (functionality) or synchronization function according to the invention. Whenever a device comprising a synchronization client is referred to, said device is also (implicitly or explicitly) configured for receiving a first and/or second media stream according to the invention.

For the purpose of this invention, whenever the term "receiver" is used, it may equally be replaced by any device suitable for comprising a synchronization client according to the invention and configured for receiving a first and/or second media stream.

For the purpose of this invention it is further understood that a marker refers to a signal associated with a (thus marked) content part of a stream, which may be used by a synchronization client to detect that content part of (or rather 'in'; the use of the term 'of' versus 'in' is a matter of form, and not substance) said stream and to either determine timing information or transmit a marker notification. A marker may be (comprise) a marker identifier if the signal is configured in a manner that it may be distinguished from other signals used to mark other content parts in said first and/or second stream. A marker identifier may for instance not be needed if there are only few markers associated with a media stream, and/or when the distance of the marked content parts on a common content time-line is large compared to an expected timing difference associated with the processing of the streams by different devices. The synchronization client may then be thus configured that for practical purposes they report timing information or a marker notification associated with marked content parts having the same position/location on a common content-time line.

Figure 1:
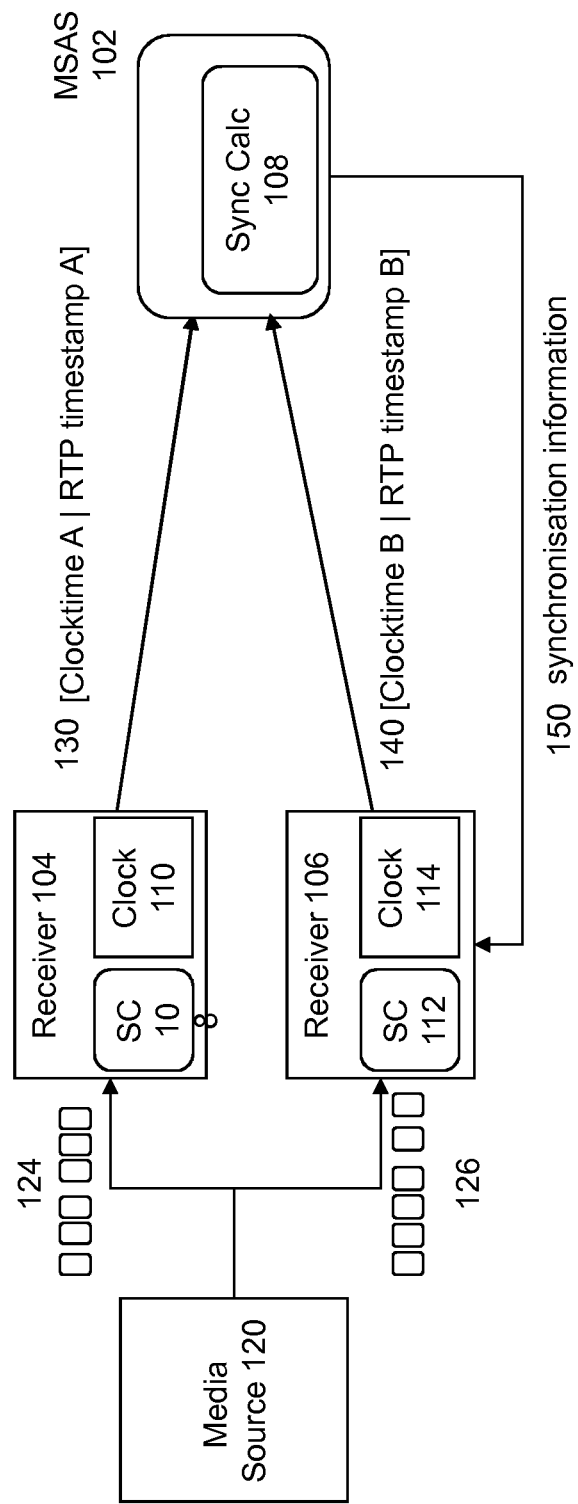
FIG. 1 shows a conventional inter-destination media synchronization system.

FIG. 1 depicts a conventional IDMS system for synchronizing the play-out of streams transmitted to a plurality of receivers. In this particular example, a media source 120 is configured to transmit at least two streams, a first stream 124 and a second stream 126, to a first receiver 104 and second receiver 106 respectively. In this particular example, the media source may be configured to deliver content to the receivers on the basis of multicast streaming and the RTP protocol. Each receiver may comprise a synchronization client (SC) 108,112, which is configured to transmit timing information, e.g. one or more clock times, indicating the time at which particular packet in a stream was processed (e.g. received, decoded or played-out) by a receiver to a media synchronization application server (MSAS) 102, (or in short a synchronization server).

As will be described hereunder in more detail, timing information may be transmitted in the form of a report, i.e. a predetermined data structure, to the MSAS. Timing information may comprise, e.g. a clock time ("Clocktime A" and "Clocktime B") generated by a synchronized clock in the receivers and an RTP timestamp ("RTP timestamp A" and "RTP timestamp B") of an RTP packet that a receiver had received. The clock time generated by a synchronized clock 110,114 in a receiver may indicate at which time a content part, e.g., (part of) an image frame and/or one or more audio samples, associated with an RTP timestamp was processed by the receiver. RTP time stamps are used to identify a particular position of a content part in the stream, so that a synchronization function 108 in the MSAS is able to calculate a timing difference, e.g. a difference in time in the processing of a particular content part on the basis of the information in the received reports.

For example, the first receiver may report the reception of a frame associated with RTP timestamp 2070000 (RTP_RCVR1_reported) at clock time 01:23:45.678 (NTP_RCVR1); and, the second receiver may report the reception of a frame associated with RTP timestamp 2250000 (RTP_RCVR2_reported) at clock time 01:23:46.678 (NTP_RCVR2).

Assuming an RTP timestamp clock frequency of 90000 Hz the MSAS may first determine the most delayed receiver by selecting a reference timestamp and subsequent calculation of the other timestamps using the reference timestamp as a basis. For example, the MSAS may select the clock time of the first receiver and calculate the RTP timestamp of the second receiver at this clock time: RTP_RCVR2_calculated=RTP_RCVR2_reported+90000*(NTP_RCVR1-NTP_RCVR2). The result of this calculation is RTP_RCVR2_calculated=2160000, indicating that the first receiver is the most delayed receiver. In other words, at time NTP_RCVR1, the RTP timestamp value of the second receiver is larger than the one associated with first receiver.

In order to achieve inter-destination synchronization, the second receiver has to adjust (in this case delay) its play-out using e.g. a variable delay buffer (not shown). This adjustment is realized on the basis of synchronization information 150, which is transmitted to a receiver (e.g., the second receiver) for adjusting its play-out. Hence, in this conventional system, RTP timestamps are used to identify the position of a particular RTP packet (carrying a predetermined content part) in an RTP stream.

Typically, protocols used for streaming content to a client (like the RTP protocol) uses metadata in the form of a sequence of values that (linearly) increases in order to define time ordering of the packets carrying content parts such as video frames and/or audio samples in a stream, e.g. a RTP timestamp, a presentation timestamp used in MPEG format, a play-back position (e.g. SMPTE time code or normal play time) used in Real Time Streaming Protocol (RTSP, see IETF RFC 2326), or one or more equivalent protocol parameters in or associated with the packets in the stream. This sequence of values, which may be referred to as sequence information, thus defines positions of content parts in a stream delivered to the receiver.

One problem with respect to a conventional IDMS system as depicted in FIG. 1 is that the same sequence information needs to be used for all transmitted streams and should not be modified during transmission. For example, when using RTP timestamps as sequence information, all streams should start with the same initial RTP timestamp value and the RTP timestamps may not be lost or altered during transmission.

In many situations however, information for determining the temporal relationship across different streams is not available. For example, if a media source sends different streams to different receivers using the RTP protocol, the media source should use different (random) initial RTP timestamp values for the different streams so that—without prior knowledge of the initial RTP timestamps—the temporal relation between the different streams is lost. This may be the case when a single source sends a separate unicast to each receiver, or sends out different multicast streams to various receivers. Similar problems arise in systems using different transport protocols and/or different codec's or—in the case of a content delivery system (CDN)—using a plurality of nodes or sources to deliver content to different receivers.

Further, in many situations the sequence information across the streams is modified during transmission. For instance, transformation of one of the streams by a transcoder, or modification of the content carried by one of the streams (e.g. an insertion of further content such as an advertisement), may destroy the initially existing temporal relationship between the streams. Therefore, in all of the above-mentioned situations a conventional IDMS system as described with reference to FIG. 1 is not able or at least less suitable to synchronize the play-out of the streams by the different receivers.

Figure 2:
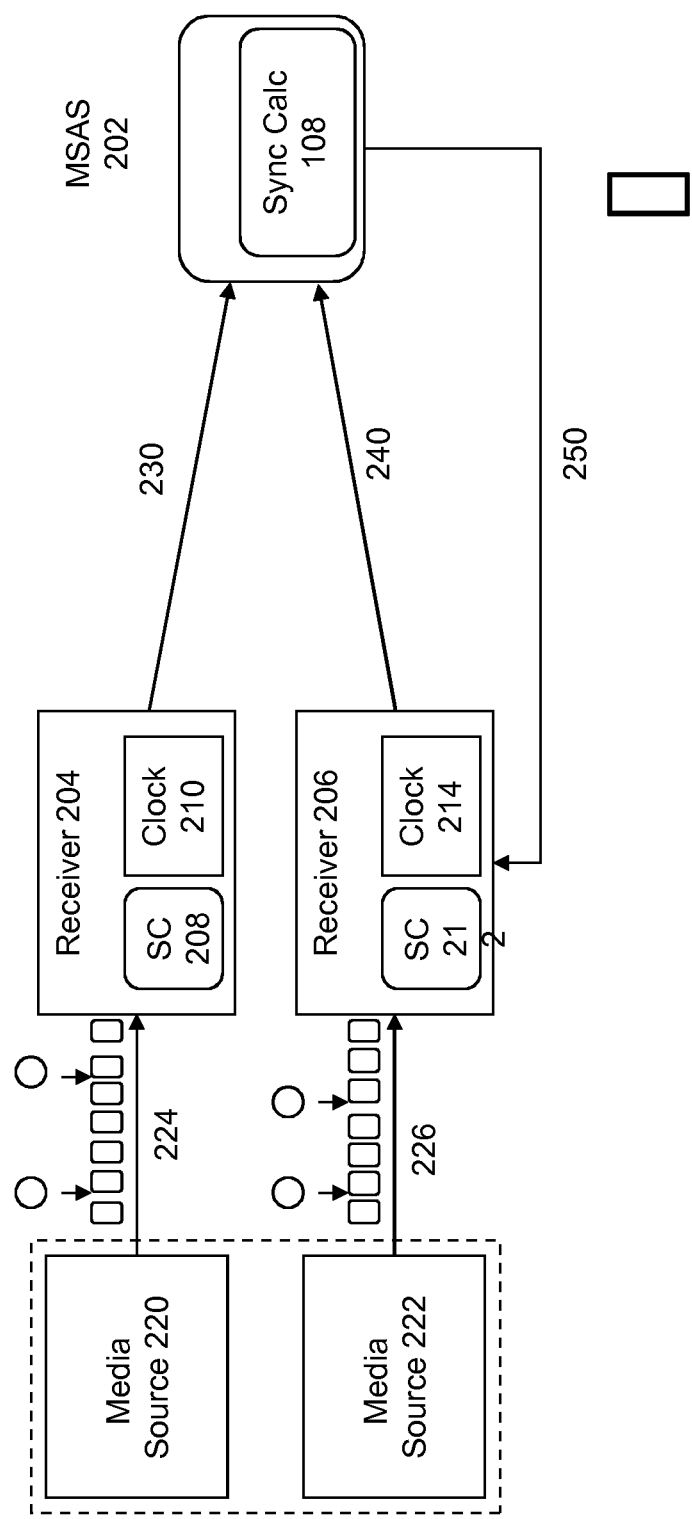
FIG. 2 shows a marker-based inter-destination media synchronization system (IDMS) according to one embodiment of the invention.

FIG. 2 shows an exemplary marker-based inter-destination media synchronization system (IDMS), according to one embodiment of the invention. The IDMS system may include one or more media sources, e.g., a first media source 220 and a second media source 222, a plurality of receivers, e.g. a first receiver 204 and a second receiver 206, and at least one media synchronization application server (MSAS) 202. First and second media source may be configured to transmit content in a plurality of streams, e.g. a first stream 224 and a second stream 226, to the first and the second receiver, respectively. In contrast with the system described with reference to FIG. 1, the streams may differ in terms of video and/or audio compression codec, video resolution and/or quality. Further, transmission of the content to the receivers may be based on different protocols (e.g. RTP, HAS, etc.) and underlying network technologies (e.g. using IP, using DVB broadcasting technologies such as DVB-C, DVB-H). The first and second receivers may be (part of a) media output devices or systems (e.g., mobile media consumption devices, home electronic media devices, computer systems, etc.) in geographically separate locations or different types of media output devices or systems at one location.

A receiver may be equipped with a synchronization client 208,212, which is configured to generate and transmit timing information 230,240 to the MSAS. It is to be understood that not only for this figure description, but also for the other figure descriptions, the term MSAS refers to a Media Synchronization Application Server comprising a synchronization function according to the invention. The timing information may be transmitted in the form of a predetermined data structure, for example a synchronization report, to the MSAS. As will be described hereunder in more detail, timing information is used to notify the MSAS that a particular content part (e.g. (part of) a video frame and/or one or more audio samples), was processed by the receiver (e.g. received, decoded, played-out, etc.). The timing information may be sent in any suitable form to the MSAS depending on the particular scheme. For example, as will be described hereunder in more detail, timing information may include a clock time, a marker identifier, an RTP time stamp or any other type of sequence information used by a particular transport protocol. Alternatively, timing information may be the arrival time of a notification message received by the synchronization function, wherein the notification message is sent by a synchronization client to the synchronization function upon detection of a marked content part.

In general, the first and second synchronization (sync) clients may be implemented at least partially as software programs and/or hardware modules configured to execute functions responsible for at least one of the detection of a marked content part, transmission (conveying/providing) of timing information or marker notifications, to the synchronization function, and/or for receiving and executing synchronization instructions from the synchronization function. The MSAS may comprise server (software) functions and/or hardware component(s) collectively referred to as the synchronization function, configured to collect and process timing information and to calculate and transmit synchronization instruction to a synchronization client of a (e.g. implemented in a) receiver.

In order to allow receivers to report on positions in a stream, e.g. to report on a particular image frame and/or audio sample in the stream, a synchronization marker (hereafter also referred to as marker, preferably a marker identifier) may be assigned to (associated with) a predetermined content part in a steam. In certain occasions, regardless the protocol or protocol stack used for transmitting a content part to a receiver, such a marker may be used to identify (indicated) the location (position) of a particular content part in a stream. This way a synchronization client may be able to identify the location of a particular content part in a stream and to notify the MSAS that such content part was processed by the receiver at a particular clock time.

As will be described hereunder in more detail, the markers enable receivers to report on timing information associated with the same content part in different streams. A marker may comprise a marker identifier, an (increasing) value and/or a flag, inserted in the metadata part of a data container (e.g., a header field). Alternatively and/or in addition, a marker may be directly inserted in the content e.g. in the form of a watermark. Yet alternatively a marker may be sent separately from the media stream and/or indirectly provided to the synchronization client (e.g. through signaling messages). A synchronization client in the receiver is configured to detect the presence of a marked content part of the stream and, optionally, to associate a clock time with the detected marker.

Hence, when the one or more content sources transmit such marked streams, each receiver will receive a stream comprising marked content parts or marked packets comprising a particular content part (denoted by circles in FIG. 2). As will be described in more detail with reference to FIG. 3, a content source may be configured to transmit marked packets such that each marker identifies a particular content part in the stream. The markers enable a synchronization client to send timing information to the MSAS on the processing (i.e. reception, decoding or play-out) of a particular content part. On the basis of the timing information, the MSAS is able to determine a timing difference between the play-out of the particular content part by different receivers (for further details relating to the generation of marked content reference is made to FIG. 3).

Upon detecting a marked content part of the stream, for example by detecting a marker in the stream, the synchronization client may generate timing information and associate that timing information with the detected marked content part and/or with the detected marker. In one embodiment, timing information may comprise a timestamp associated with a predetermined clock time, that is generated on the basis of a synchronized wall clock (e.g., first and second clock 210, 214) in the receiver. Hence, the clock time may indicate the time a particular marked content part was processed (e.g. received, decoded or played-out) by the receiver. In some embodiments, the timing information may be transmitted in a synchronization status report having a data structure as described in ETSI TISPAN TS 183 063 V3.5.2 or IETF ID draft-ietf-avtcore-idms-02.

The wall clocks (i.e. the clocks of the receivers, used for generating the clock times according to the invention) may be synchronized using, e.g., Network Time Protocol (NTP). In one embodiment, (NTP) synchronized clocks are not required if a low-delay communication channel is used for transmitting timing information to the MSAS and synchronization information to the client. In that case, a client may send its timing information immediately upon reception of packets that are reported on. Other embodiments may include determining/estimating network delays that timing information suffers when transmitted via the network from one entity to another.

In one embodiment, if the delay between the receiver and the MSAS is known or very small (e.g. because a low-delay communication channel between the client and the MSAS is used), the timing information may only comprise a marker notification, i.e. a notification that a marker is detected by the client. In that case, the MSAS may determine that the reception time of this notification is substantially the same as the detection time of the marker by the client. Hence, in such an embodiment no synchronized wall clock is required in the client. Instead, the timing information transmitted by a first and second client to the MSAS only comprises a notification of the detection of a marker. In an embodiment, such notification may comprise a marker identifier. An notification originating from the first and second receiver may be associated with a clock time by timestamping notification upon reception by the MSAS. Then, on the basis of these timestamped notifications, the MSAS may determine the most delayed receiver and transmit synchronization information to at least one of the receivers, wherein such synchronization information may be used by the receiver to adjust the play-out of the received media stream in a manner that t inter-destination synchronization of the play-out of two streams arriving at different receivers may be achieved. It is to be understood that play-out is just one processing step of media at a receiver for which inter-destination synchronization may be achieved according to the invention. Other processing steps that may be synchronized amongst different receivers may relate to decoding or any other form of interaction with the received media streams. It is further understood that for the purpose of the invention, the media streams arriving at different receivers, need not comprise the same content, as long as the streams share some common content (play-out) time-line, inter-destination synchronization according to embodiments of the invention may be useful and applicable.

In another embodiment, when a marker is detected a synchronization client may transmit timing information to the MSAS, wherein the timing information comprises marker information. The marker information may include a marker identifier for identifying the marked content part associated with the detected marker and/or the detected marker itself. In one embodiment, the identifier may enable one marker to be distinguished from at least one or more adjacent markers in the stream. The use and the advantages associated with marker information are described in more detail with reference to FIG. 6A-6C.

Referring back to FIG. 2, when the MSAS receives timing information associated with the detection of the same marked content part, e.g. frame, in the first and second stream, it may initiate synchronization calculations on the basis of the received timing information in order to determine a timing difference between the first receiver and the second receiver. The calculation may include subtracting the timing information from the first receiver from the timing information from the second receiver (e.g., finding a difference in clock times) similar to the calculations as described with reference to FIG. 1.

As referred to above, in order to start a synchronization calculation, in one embodiment, the timing information may relate to the detection of the same marked content part in the first and second stream. This may for example be determined on the basis of the marker information sent along with (e.g. as a subset of) the timing information to the MSAS (as discussed in more detail with reference to FIG. 6A-6C). If the timing information received from the different receivers is associated with a marker corresponding to the same position in the content streams, the MSAS may determine a timing difference by subtracting the first clock time from the second clock time (assuming that the clock times are provided by time-synchronized clocks). If however the received timing information is associated with different markers (identified e.g. by different marker identifiers), the received timing information associated with subsequent markers may be stored in a storage medium, e.g. a cache. Upon receiving timing information that corresponds to the same marker (identified by the same marker identifier), then the synchronization calculations may be performed on the timing information stored in storage.

Alternatively, if the received timing information relates to different markers, the synchronization function may take this into account when calculating the timing difference and subsequent synchronization information. In an embodiment the synchronization function is provided with information about the distance on the content time line between all, or only the relevant markers, in the media stream. For example, content parts in media streams may be periodically marked wherein each subsequent marker is identified with an increasing marker value (e.g. marker 000 at t=0, marker 001 at t=5 s, marker 002 at t=10 s, etc.), so that the distance between a reported marker identifier in a first media stream and a second marker identifier in a second media stream can be determined. Such distance may for instance be provided in any suitable time unit. Alternatively such distance may be provided using other units, indicating a separation degree, such as for instance the number of packets. Hence, when the temporal relation between markers in media streams is provided to the synchronization function in the MSAS, the function can determine a timing difference between a first reported marker identifier and a second reported marker identifier on the basis of the timing information, i.e. the clock times and the marker identifiers and the temporal relation between said marker identifiers.

Based on the synchronization calculations, synchronization information for a receiver to adjust, e.g. advance or delay, the play-out of the stream is generated. In some embodiments, the synchronization information may be transmitted in a predetermined data structure referred to as a Synchronization settings instruction as defined by ETSI TISPAN and Internet Engineering Task Force (IETF) ETSI TISPAN TS 183 063 V3.5.2 and IETF ID draft-ietf-avtcore-idms-02. The synchronization information 250 generated by the MSAS on the basis of the calculated timing difference is then transmitted to at least one of the receivers in order for the synchronization client in the receivers to adjust play-out in response. Adjustment of the play-out may be realized by instructing a variable delay buffer in the receiver.

Hence, in contrast with the conventional IDMS system of FIG. 1, the marker-based IDMS according to the invention allows inter-destination synchronization of a plurality of receivers wherein the same content may be streamed from different sources, using different formats and/or on the basis of different protocols to a plurality of receivers.

Furthermore, the marker-based IDMS system allows streams to be transmitted using different transport protocols. For instance, two receivers, e.g. a television receiver and a mobile device may receive marked content associated with the same linear program (e.g., a television broadcast), via two different streaming protocols, e.g. a multicasted stream based on the RTP protocol, and another stream based on the HTTP Adaptive Streaming (HAS) protocol. The content may be marked different levels in the protocol stack used to transmit content to receivers. Alternatively the content may be marked at content-level using e.g. watermarking techniques. In that case, inter-destination synchronization may be achieved even when the content is transcoded somewhere in the path between the client and the receiver.

In yet another example, marker-based IDMS may be used in situations wherein the sequence information associated with a protocol is not suitable for the purpose of inter-destination synchronization. For example, as explained in IETF RFC 3550, several consecutive RTP packets will have equal RTP timestamp values if they are (logically) generated at once, e.g., belong to the same video frame. Furthermore, consecutive RTP packets may contain RTP timestamp values that are not monotonic if the data is not transmitted in the order it was sampled, as in the case of MPEG interpolated video frames (The sequence numbers of the packets as transmitted will still be monotonic.). Hence, even in situations, inter-destination synchronization on the basis of synchronization markers is possible.

Figure 3:
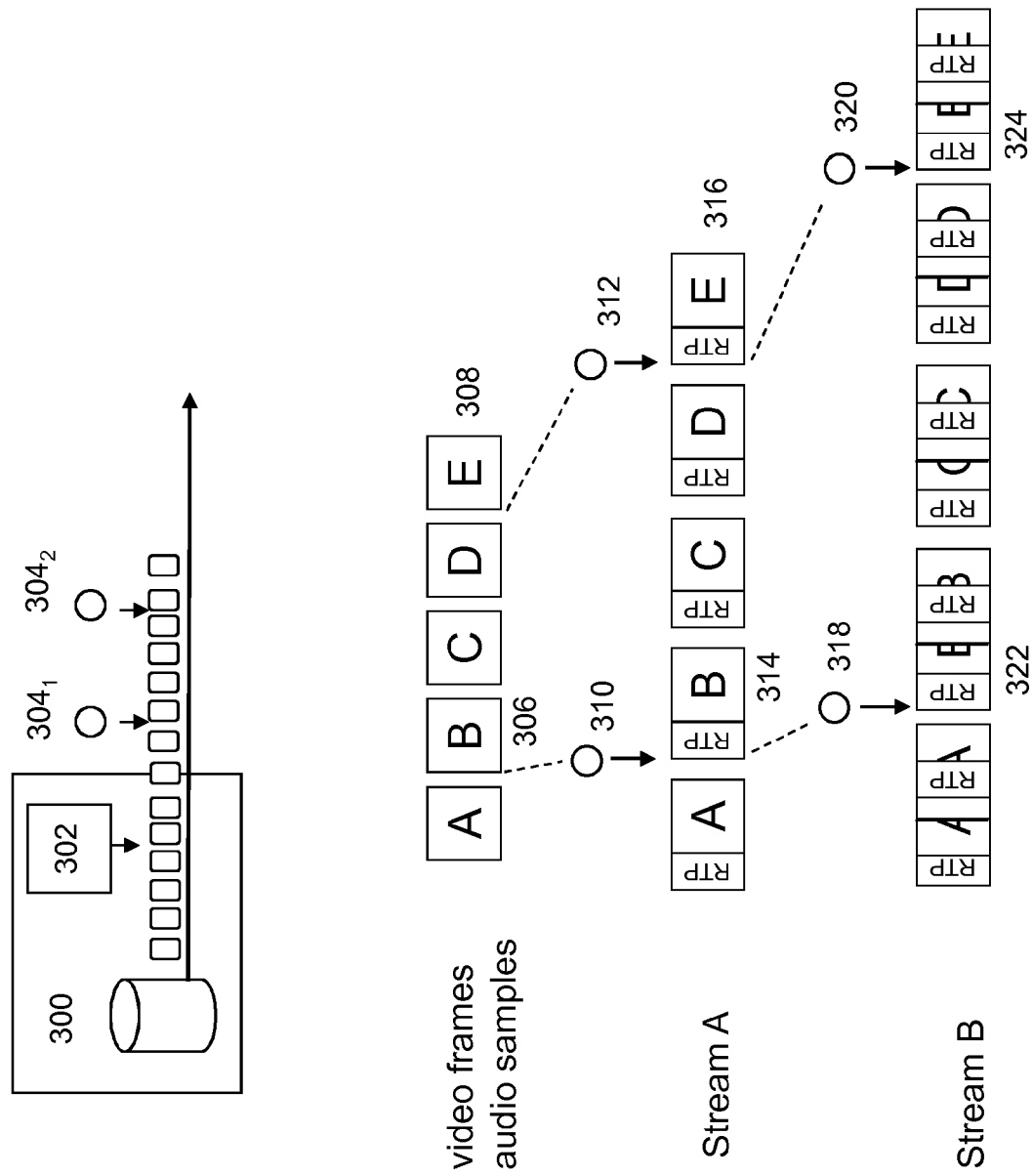
FIG. 3 depicts the process of generating a marked media stream according to an embodiment of the invention.

FIG. 3 depicts the process of generating a marked media stream according to an embodiment of the invention. In this embodiment, a video may be packetized and sent out in two differently packetized stream versions to different receivers. For example, in a first stream, video frames associated with a video may be packetized into an RTP stream such that one video frame is carried by two RTP packets, while in the second stream, video frames associated with the same video may be packetized in an RTP stream such that each RTP packets may comprise one frame.

During the packetization process, a marker function 302 in the content source 300 may introduce (synchronization) markers $304_{1,2}$ for marking the position of a particular content part, e.g. (part of) a video frame, in the stream. For example, in one embodiment, the header of a packet may comprise a marker field comprising marker information, e.g.

a particular marker flag and/or a particular marker identifier, which is detectable by the synchronization client in the receiver. In one embodiment, marker identifiers may be periodically introduced in the media stream (e.g. every 2 second or 200 media containers) wherein the value of the marker identifiers monotonically increases.

Hence, as indicated in FIG. 3, the first marked RTP stream A may be produced by a first packetization process wherein frames A and E 306,308 of the video are inserted in a first and second RTP packet 314,316 and a marker 310,312 may be introduced into a predetermined field of the header of these packets to mark the start position of those frames in the first RTP stream. In a similar way, a second marked RTP stream B may be produced by a second (different) packetization process wherein the first part of video frames A and E 318,320 are inserted in a first and second RTP marked packets 322,324. Hence, on the basis of the introduced markers, the position of a particular content part, e.g. a video frame, may be determined for different streams, which are packetized differently.

In a single source situation, markers may be introduced during transmission to clients such that all streams originating from the source include markers pointing to the same content parts. In a multi-source situation, markers may be introduced based on a pre-determined agreement or algorithm between the multiple sources to ensure that markers are inserted at the correct positions in the steams. For this situation, reference is made to FIG. 17. In a further embodiment, a first source comprising a marker function may produce a marked content stream and subsequently distribute copies of this marked content stream to a number of media servers (e.g. a number of distribution nodes in a CDN) for further distribution to clients.

In some embodiments, the marker may be associated with a marker identifier such that markers may be distinguished from other (adjacent) markers in a stream.

The use of such marker identifiers may depend on the marker frequency in a stream and the maximum delay between different streams. For example, in a particular system wherein for each stream markers are inserted every 20 seconds, wherein the maximum delay difference between streams is not larger than 5 seconds and wherein timing information is transmitted in a low-delay channel to the synchronization server, the server may assume that timing information received at roughly the same time is associated with markers in different streams which relate to the same position in the content.

However, if the marker frequency is higher and/or delay variations are higher, then timing information received from different receivers may relate to different marked positions in the different streams. Hence, in that case, by assigning a marker identifier to a marker and sending this marker identifier along with the timing information to the synchronization server, it is possible to determine timing information from different clients on the same marker. This process is described in more detail with respect to FIG. 6A-6C.

Figure 4:
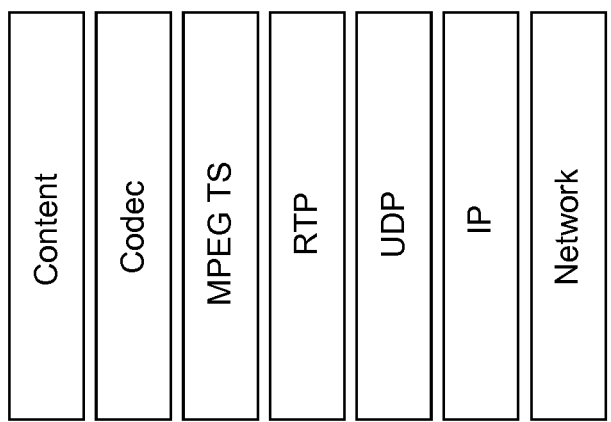
FIG. 4 schematically depicts a protocol stack comprising protocols, which may be involved when streaming content to a client.

Although the marking process depicted in FIG. 3, is described with respect to marking RTP packets by inserting marker information in the header an RTP packet, markers may be inserted at other protocol layers associated with a content stream. FIG. 4 schematically depicts an exemplary protocol stack comprising protocols, which may be involved when streaming content to a client. For example, content may be encoded in accordance with a particular video compression codec, e.g. H.263 or the like, packetized into MPEG transport stream (TS) packets, which may be carried in various packet formats, e.g. carrying a Transport Stream in RTP packets, using the UDP protocol over an IP network (TS/RTP/UDP/IP), or transporting a Transport Stream directly in UDP packets (TS/UDP/IP), etc. As illustrated in FIG. 4, preferably markers may be inserted in the header of packets associated with the transportation, presentation layer or application layer, e.g. an RTP packet header, TS packet headers or a codec payload header.

Alternatively and/or in addition, a content part, e.g. a frame may be marked using a known digital watermarking technique. In that case, a marker function in the content source may embed particular information, e.g. a marker identifier, directly into a frame and/or audio. This information may be not visible to a user when the stream is played-out.

Figure 5:
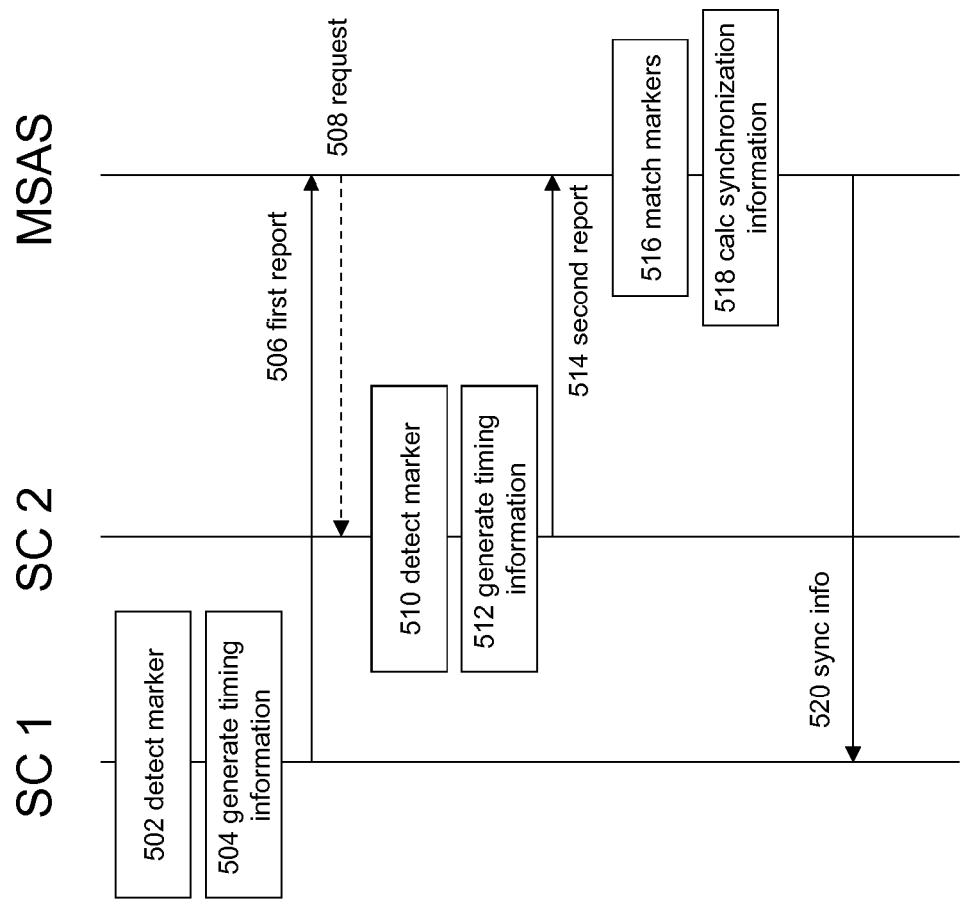
FIG. 5 shows an illustrative flow diagram of an inter-destination synchronization process according to various embodiments of the invention.

FIG. 5 shows an illustrative flow diagram of an inter-destination synchronization process according to various embodiments of the invention. In particular, FIG. 5 depicts a flow diagram of marker-based IDMS processes for use in a system as described with reference to FIG. 2. In this system a first receiver comprising a first synchronization client SC1 may receive a first marked stream and a second receiver comprising a second synchronization client SC2 may receive a second marked stream wherein the markers in the first and second marked stream, mark the positions of the same content parts.

The process depicted in FIG. 5 may start with SC1 detecting a synchronization marker (e.g. in the header of a protocol packet and/or as a watermark in a video frame or audio sample) (step 502). Then, upon detection of the marker, SC1 may generate first timing information (step 504). In one embodiment, the first timing information may comprise a clock time generated by a (NTP) synchronized wall clock in the client. In a further embodiment, the SC1 may also determine a marker identifier associated with the detected marker. In that case, the first timing information may also comprise first marker information, e.g. a marker identifier associated with the detected marker. Then, the SC1 may send the first timing information to the MSAS (step 506). This information may be transmitted to the MSAS in a predetermined data format, such as first synchronization status report to the MSAS.

In an optional embodiment, the SC2 may be configured to transmit timing information in response to a timing information request originating from the MSAS. For example, when the MSAS receives first timing information from the SC1, it may send a timing information request comprising a marker identifier associated with the marker detected by the SC1 (step 508). The SC2 will only send the second timing information to the MSAS if it detects a marker with an identifier, which matches the identifier in the timing information request.

The SC2 may detect a marker in the second stream (step 510) and generate second timing information (step 512), e.g. a second clock time generated by a (NTP) synchronized wall clock in the client. Further, in one embodiment, SC2 may generate second marker information comprising a marker identifier associated with the detected marker. Then, the SC2 may send the second timing information, optionally including, the second marker information, to the MSAS (step 514). This information may be transmitted to the MSAS in a predetermined data format, such as second synchronization status report to the MSAS.

Based on the received information, the timing difference between SC1 and SC2 is calculated at MSAS. In one embodiment, the timing information originating from the SCs only comprises a clock time. In that case, the MSAS assumes that the timing information received from the plurality of synchronization clients relates to one particular marker marking a predetermined position in the content. This may be the case, if the system is configured such that the maximum timing difference between the synchronization clients is less than half the time period between subsequent markers in a stream. If the maximum timing difference is more than half the time period between subsequent markers, an MSAS cannot know for sure if a certain received timing information from one receiver is on the same content part of an earlier or later timing information from another receiver.

Hence, in another embodiment wherein the relation between the maximum delay and the detection of subsequent markers in a stream cannot be determined accurately, the SC1 and SC2 may transmit timing information and associated marker identifiers to the MSAS. The marker identifiers are then used by the MSAS to check whether the timing information received from the different clients relate to the same marker or to different markers (step 516). When marker identifiers associated with different timing information match, the timing information belongs to the same marker. If the timing information does not correspond to the same marker, the timing information may be stored by the MSAS for later comparison.

The timing information from different clients relating to one marker associated with one particular position in the content is used to calculate the timing difference between the clients (step 518). In particular, the timestamp values in the timing information may be subtracted to determine a timing difference between the play-out or reception timing of the different clients. Based on the thus determined timing difference, synchronization information may be generated and transmitted to at least one of the synchronization clients (step 520).

In a further embodiment, the process depicted in FIG. 5 may be used in a system wherein the clients do not have or, at least do not use, a synchronized (NTP) clock. Instead, a low-delay channel is set up between the client and the MSAS in order to allow fast transmission of information between the client and the MSAS. In that case the process may start with SC1 and SC2 detecting a synchronization marker and immediately transmit first and second timing information to the MSAS. In that case, the timing information may include a notification that a marker is detected. When a notification is received by the MSAS, a clock time is associated to the notification (i.e. the notification is time stamped). The clock time and, optionally, the marker information is subsequently used by the MSAS to determine the timing difference and the related synchronization information to adjust play out of at least one of the receivers.

Figure 6A:
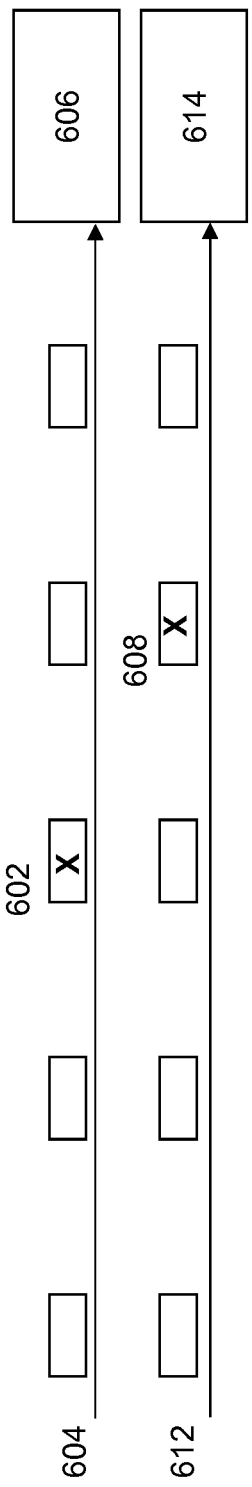
FIGS. 6A-6C illustrate schematics of different marked streams for use in an IDMS system according to the invention.
Figure 6B:
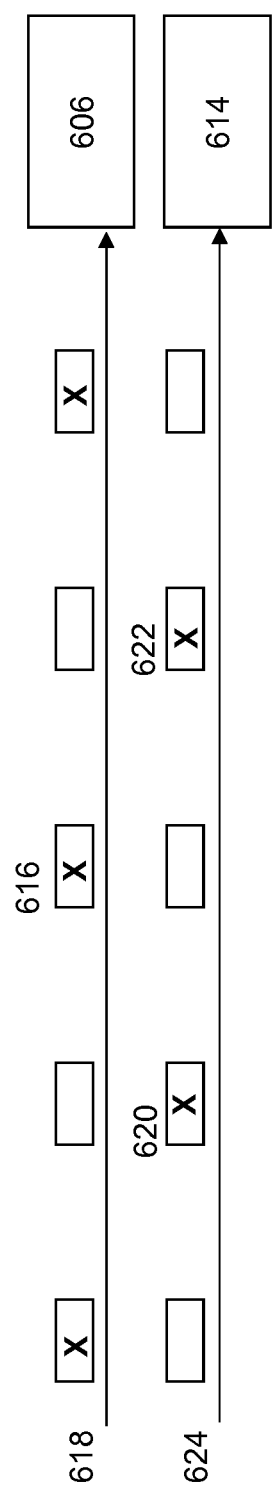
Figure 6C:
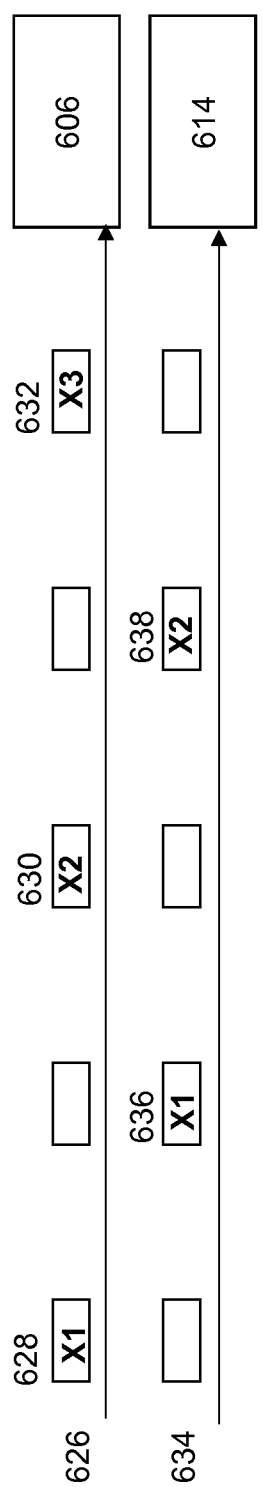

FIGS. 6A-6C illustrate schematics of different marked streams for use in an IDMS system according to the invention. In particular, FIG. 6A-6C illustrate in which circumstances the use of marker identifiers may be required. FIG. 6A relates to a content delivery system which is configured such that the maximum expected delay between different streams is significantly less than half the marker period, i.e. the time period defined by two adjacent marker position. In that case, it may be assumed that timing information received from two receivers, e.g. a first report received from a first receiver and a second report received from a second receiver, at about the same time corresponds to the same marker associated with one particular position in the content.

For example in FIG. 6A, a first marker X 602 may mark a first packet in a first stream 604 transmitted to a first receiver 606 and a second marker X 608 may mark a second packet in a second stream 612 transmitted to a second receiver 614. Both markers mark 602,608 the same position in the content, however due to network delays the first marked packet will arrive at first receiver slightly earlier than the second marked packet at the second receiver. As there are no further marked packets in the first and second stream, timing information received by the MSAS may be unambiguously related to the detected marked packets and therefore no further information is needed by the MSAS to determine the timing delay.

However, when the frequency in the streams is increased and/or larger delays between the streams are allowed, the MSAS may not be able to determine whether timing information received from different receivers relate to the same position in the content. For example, in FIG. 6B, the marker period is smaller (marker frequency is higher) so that timing information is received at a higher rate by the MSAS, e.g. in the from of reports. In that case, the MSAS requires further information in order to determine whether a packet associated with e.g. marker X 616 in the first stream 618 relates to a first or second detected marked packet 620,622 in the second stream 624 and to determine which receiver is ahead or delayed. In that case, markers may be labeled with marker identifiers so that markers can be distinguished by the MSAS.

The use of marker identifiers is depicted in more detail in FIG. 6C wherein a first stream 626 transmitted to a first receiver comprises marked packets 628-632 associated with marker identifiers X1, X2, and X3 marking certain predetermined positions of content parts in the stream. Similarly, the second stream 634 transmitted to the second receiver comprises marked packets 636,638 associated markers X1 and X2, and so on. Upon detecting of a marker, the synchronization client may send timing information, preferably comprising marker information (e.g. a marker identifier) to an MSAS. The timing information received from the different receivers having the same marker identifier may be used to calculate a timing difference associated with the processing (e.g. play-out) of said first and second stream by said first and second receiver respectively.

The marker identifier may not necessarily be a unique identifier. In one embodiment, a marker identifier may be unique for a subset of subsequent markers in the stream. For instance, if the marker frequency is not too high, the markers may simply be implemented using a binary flag for marking content parts as "even" ("0b") and "odd" ("1 b"). This scheme may be used if the expected delay between receivers is less then the time between two markers. In another embodiment, the markers may be a cyclic set of sequentially numbered values, e.g., 1, 2, 3, 4, 5, 1, 2, 3, 4, 5, etc.

Figure 7:
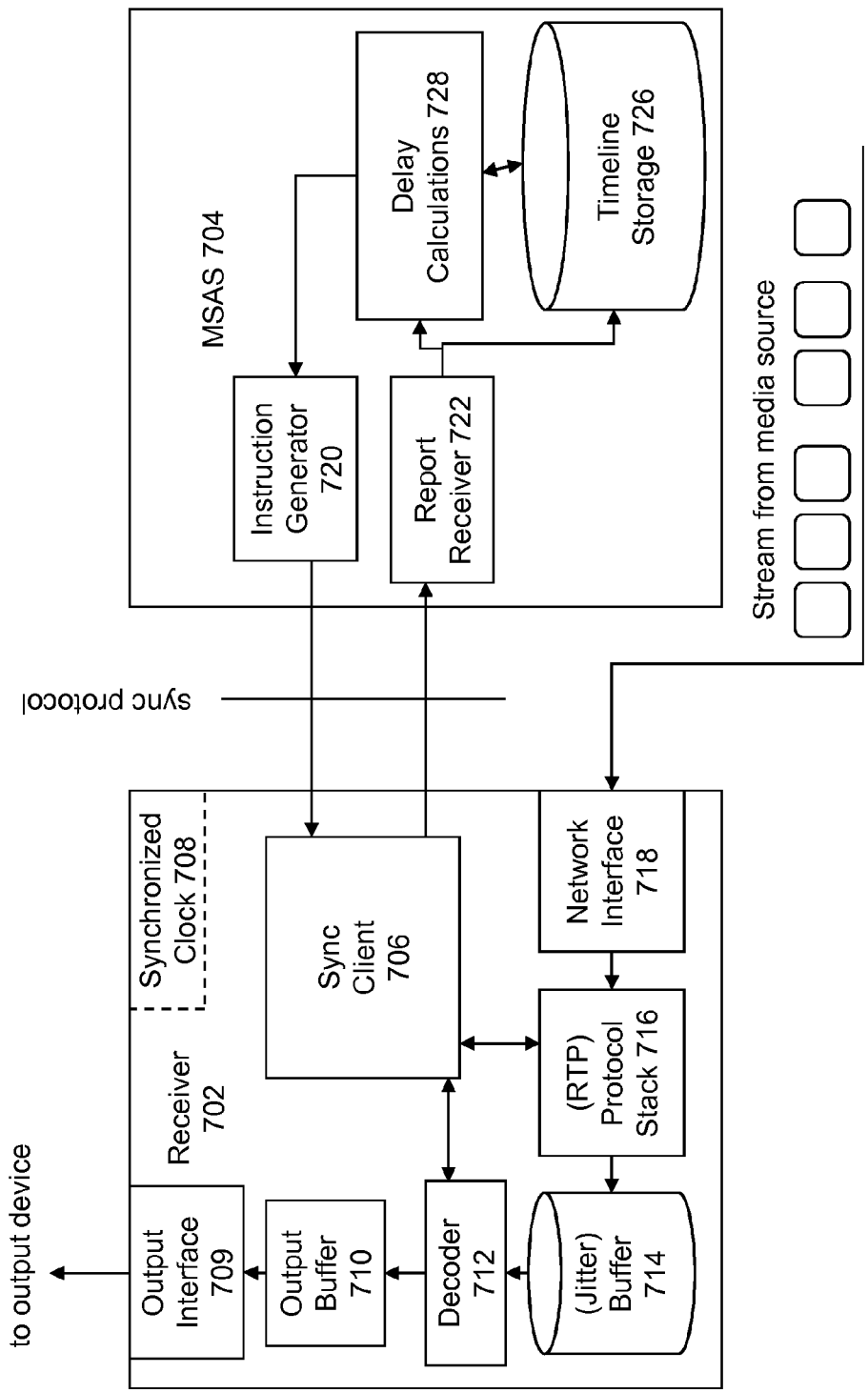
FIG. 7 shows a schematic of at least part of an IDMS system according to one embodiment of the invention.

FIG. 7 shows a schematic of at least part of an IDMS system according to one embodiment of the invention. In particular, FIG. 7 depicts a receiver 702 comprising a synchronization client 706, which is configured to communicate with an MSAS 704. The receiver may comprise a media streaming client 718 comprising a network interface configured to receive content, e.g. a packetized stream, from one or more content sources in the network. The received packets of a media stream are passed on to a depacketizing unit 716 for depacketizing received packets in accordance with the particular protocol stack associated with the media stream. For example, it may depacketize packets in accordance with in various packet formats, e.g. TS/RTP/UDP/IP, TS/UDP/IP, as described with reference to FIG. 3. During the depacketization process, e.g. encoded video frames and audio samples in the payload of the packets may be extracted and stored in the buffer 714 and packet header information may be extracted and used as control data which may be used by the various packet processing functions in the receiver.

The buffer may be used to smooth out delays in the network disrupting the smooth play-out of media samples (e.g. jitter) or to store a plurality of samples in case of, e.g., interpolated video encoding. For the latter purpose of decoding interpolated video frames, a separate decoding buffer may be used (not shown) in a decoder 712. The decoder may receive encoded frames and decodes them according to a predetermined decompression scheme. The decoded frames are sent to an output buffer 710 associated with an output interface 709 of an output device for e.g. video and/or audio play-out.

To enable the reporting of timing information associated with a marked content part, e.g. a frame or an audio sample, the receiver may be equipped with synchronization client 706, which is configured to detect such marked content part. In one embodiment, the synchronization client may be further configured to timestamp the detection of a market content part. Timestamping may be based on a clock 708 in the receiver, which may be synchronized using e.g. NTP or GPS time. Depending on which protocol layer of the stream in which markers may be provided, the synchronization client may receive or have access to data from that layer in order to detect the markers.

For example, in one embodiment, if markers are inserted at the transport level, the synchronization client 706 may receive at least packet header information from the depacketizing unit and/or the network interface. In another embodiment, if markers are inserted the codec level, the synchronization function may have access to the codec payload header so that it is able to detect the presence of a marker. In yet another embodiment, if the marker was inserted as a watermark in the actual content, the decoder (and/or the synchronization client) may be configured to detect the watermark and timestamp the moment in which the watermark is detected. Assuming that the time a decoded frame spends in the output buffer and the output interface is negligible, then the timestamp recorded either at the decoder or the sync client upon the detection of the watermark is substantially close to the presentation time of the watermarked content.

Hence, from the above, it follows that the synchronization client is able to detect a marked content part and to generate timing information in response to such detection. In one embodiment, timing information may comprise a timestamp identifying the moment at which the marked content part is presented to the user (the play-out or presentation time), decoded, depacketized or received by the network interface (the packet reception time). In another embodiment, the timing information may comprise a notification that a marker is detected. The synchronization client may also be configured to detect a marker identifier as already described with reference to FIG. 6A-6C.

Upon detection of a marker and generation of timing information associated with the marker, the timing information (optionally comprising a marker identifier) is transmitted, e.g., in a report, to the receiver 722. The received timing information comprising marker information such as the marker identifier, may be stored in data storage 726. In one embodiment, the data storage may comprise a data table associated with each receiver comprising received reports. On the basis of the data storage, a calculation module 728 may determine the timing difference between at least two receivers to an instructions generator 720. The instruction generator may generate synchronization (instruction) information and transmit the synchronization information to the synchronization client to adjust, e.g. delay, the play-out of the content being delivered by the media stream. The synchronization client may e.g. use the synchronization information to instruct the buffer 710, which may be configured as a variable delay buffer, to delay the play-out of video frames.

Figure 8:
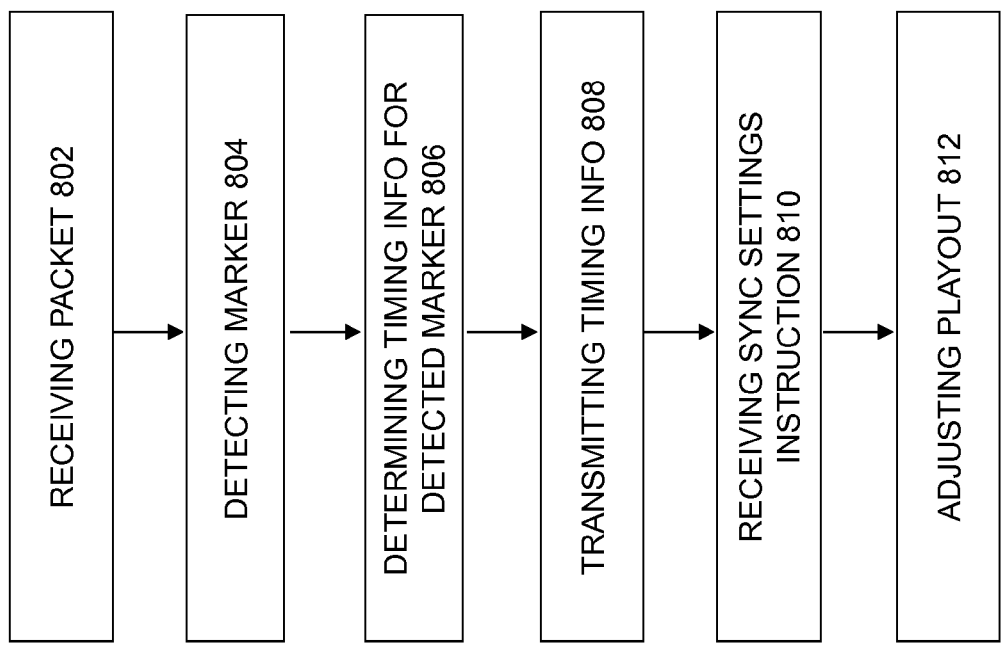
FIG. 8 depicts a flow diagram of process executed by a synchronization client according to one embodiment of the invention.

FIG. 8 depicts a flow diagram of process executed by a synchronization client according to one embodiment of the invention. The process may start with a receiver, in particular a streaming function in the receiver, receiving packets associated with a marked stream (step 802). During the process of extracting content parts, e.g. video frames and/or audio samples, from the packets, the synchronization client may detect a marked content part. The marker may be detected as a flag or value in a header field of a packet or as a watermark embedded directly in the content, e.g. content frame and/or audio sample (step 804). The detection of the marker may also include the determining of the optional identifier associated with the marker.

Upon detecting the marker, timing information associated with the marked content part (e.g., a clock time generated by a synchronized clock in the receiver) may be determined (step 806). The timing information may be associated with the receipt of the packet in which a marker is detected. Alternatively, in some embodiments, the timing information may be associated with the presentation or play-out time of the marked content part. The timing information including, in some cases, the marker identifiers, may be formatted in a report and transmitted to the MSAS.

In one embodiment, a low-delay channel is used between the synchronization client and the MSAS. In that case, timing information may have the form of a notification for notifying the detection of a marker to the MSAS. Upon reception of the notification, the MSAS may timestamp the notification with a clock time. The clock times associated with the timestamped notifications from different receivers may be used by the MSAS to determine the timing difference.

The timing information including in some embodiments a marker identifier (e.g., in a synchronization report) may be transmitted to the MSAS (step 808). The MSAS may then determine timing information that corresponds to the same marker received from other receiver(s), e.g., as stored in the storage. On the basis of the timing information originating from receivers, the MSAS may calculate timing delays between the play-out of the different receivers.

The synchronization client may receive synchronization information from the MSAS (step 810), which may include instructions to delay the play-out of the content. Finally, the synchronization client may adjust the play-out of the content stream by e.g. adjusting the settings of a variable delay buffer in the receiver.

Figure 9:
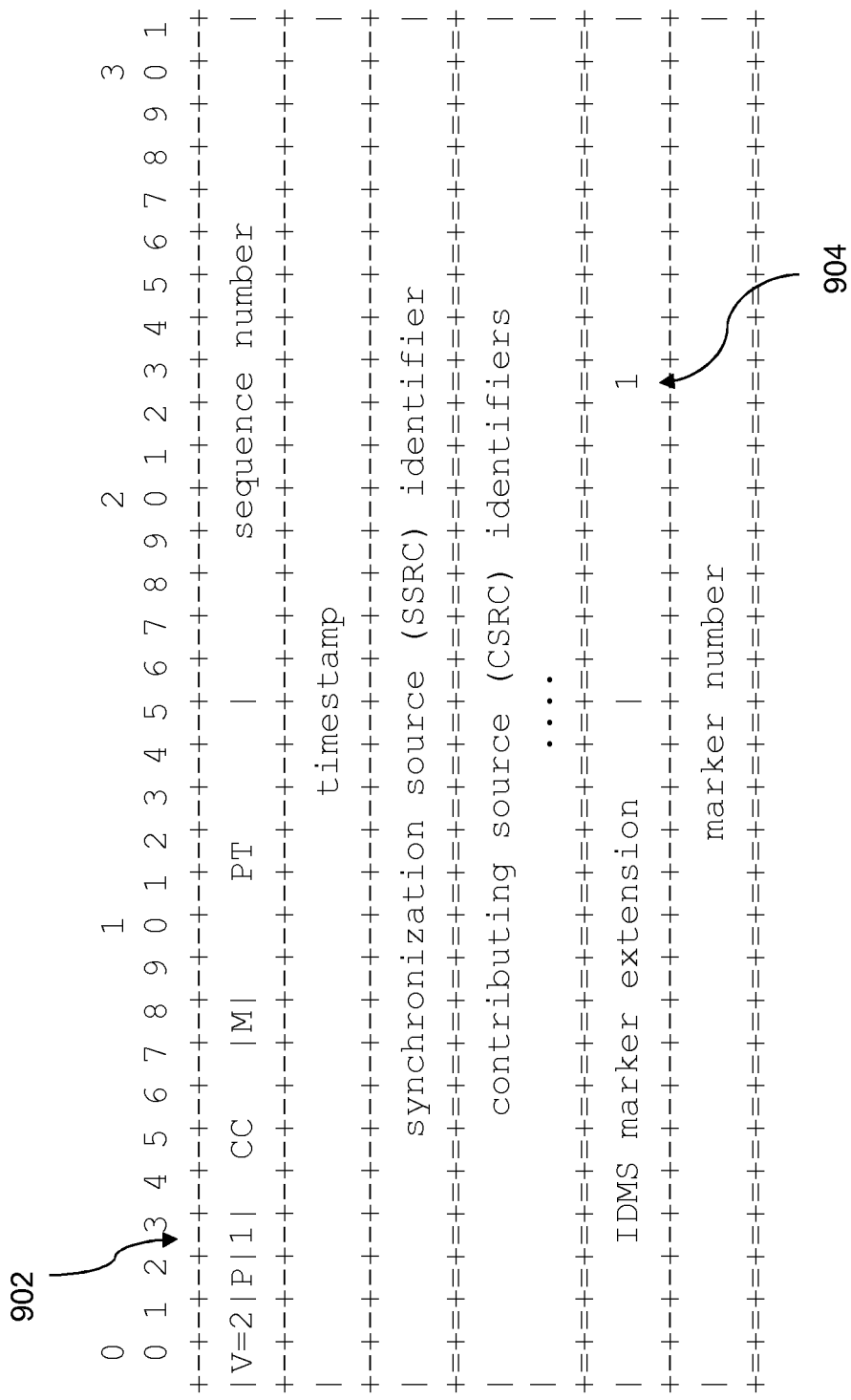
FIG. 9 shows an exemplary synchronization marker used in RTP (Real-time Transport Protocol), according to one embodiment of the invention.

FIG. 9 shows an exemplary RTP header comprising a synchronization marker field according to one embodiment of the invention. The RTP protocol is specified in IETF RFC 3550. RTP headers may be extended through header extensions. To use a header extension, an extension bit field 902 in the header is set to 1. As shown in FIG. 9, the header may comprise standard RTP fields like the RTP sequence number, the RTP timestamp and the RTP SSRC. The header may further comprise an IDMS extension field. The field is formatted as two lines, i.e. two 32-bit words, in the report description wherein a first part of the first word (e.g. the first 16 bits) may include a code identifying the extension as an IDMS marker extension. This code may be unique for the RTP profile used, to distinguish it from other extensions used with a certain profile. Further, a second part of the first word (i.e. the last 16 bits of the first 32 bit word) 904 may indicate the further length of the extension. For example, a value "1" in this field may indicate that the IDMS marker extension is a single line (i.e. a 32 bits word) in the report description beyond the first 32 bit word extension header. Such 32 bit word may provide sufficient space for defining unique marker identifiers throughout a media session.

The marker extension does not need to be inserted in every RTP packet sent to a receiver. Instead, an RTP packet only needs to be extended with an IDMS marker extension when a marker number is inserted.

Figure 10:
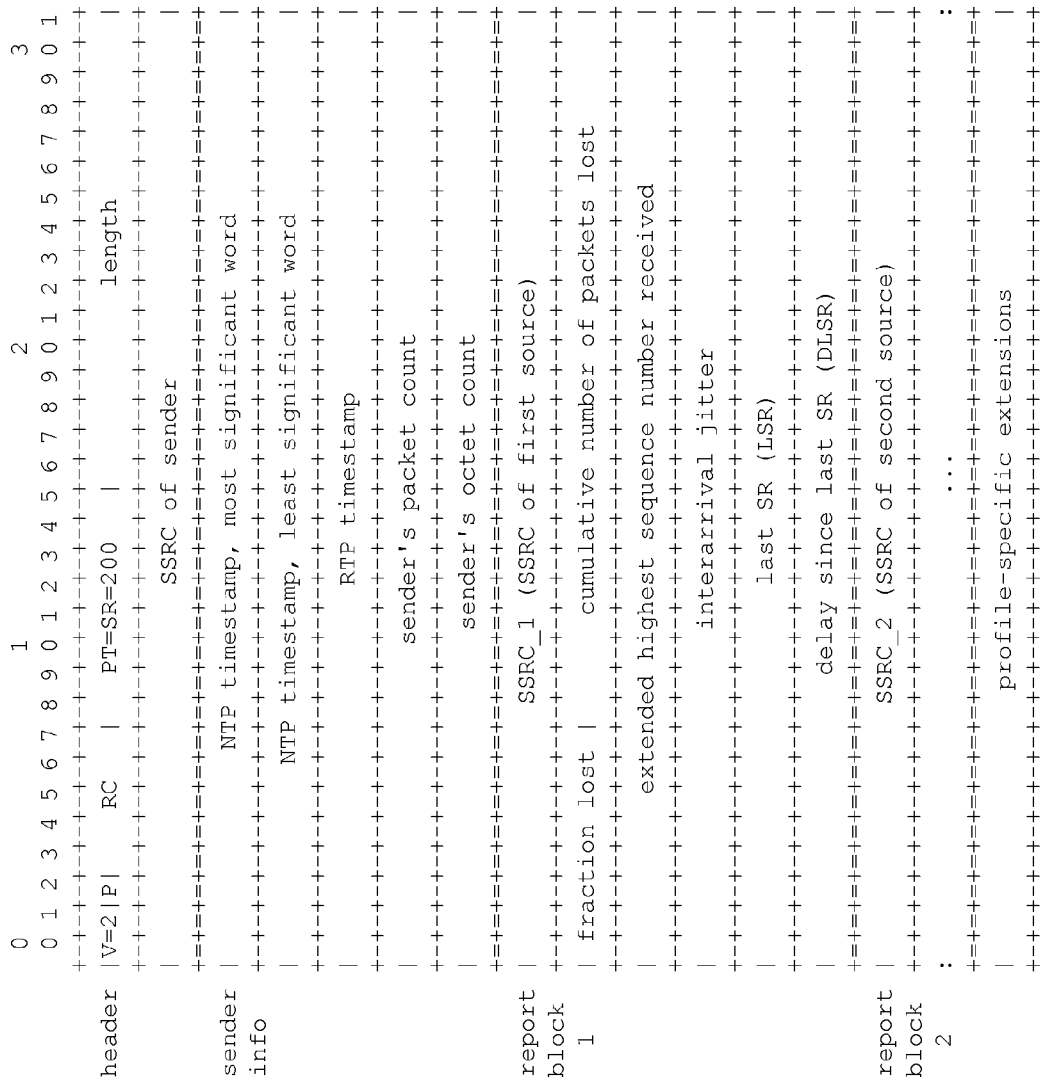
FIG. 10 shows a exemplary synchronization marker used in RTCP (Real-time Control Transport Protocol), according to one embodiment of the invention.

FIG. 10 depicts a way of associating a synchronization marker to a content part according to one embodiment of the invention. In particular, FIG. 10 depicts the use of an RTCP sender report (SR) to mark a content part in an associated RTP packet. Hence, in this embodiment, instead of inserting a marker in the header of a packet as e.g. described with reference to FIG. 9, an RTCP stream, separate from an RTP stream, is used to mark content parts in the RTP stream.

Hence, a synchronization marker may be associated with a content part in a content stream on the basis of a different protocol, in this case the RTCP protocol used in conjunction with the RTP protocol. RCTP is specified in IETF RFC 3550 describing so-called Sender Reports (SR), which are sent by a media source to receivers. A SR may comprise a "sender info" area comprising amongst other an RTP timestamp field 1002 comprising an RTP timestamp value identifying a RTP timestamped RTP packet comprising a content part, e.g. at least part of a video frame or audio sample, in the associated RTP stream it applies to. Accordingly, the SR in an RTCP packet "marks" a content part, i.e. a frame and/or an audio sample, in the RTP stream.

A SR is not sent for each RTP packet in the RTP stream. Instead, SRs are only transmitted for certain RTP packets wherein the frequency of the transmitted SRs may depend on how often a media source may transmit RTCP packets in accordance with the RTCP rules to a receiver. Provided that a synchronization client is configured to detect an RTCP packet and report on the RTP packet indicated in an SR of the RTCP packet, in one embodiment, the SR as such may be used as a marker. Hence, the media source should be configured such that SRs to the different receivers are "marking" the same content part in the various streams that are transmitted to the different receivers, and if marker identifiers are included, that the identifiers are the same for the same marked position in the various streams.

The SR may further comprise NTP timestamp fields. At least one of these fields, e.g. the "NTP timestamp, most significant word" field 1004 may be used as a marker identifier. As the 32 most significant bits of an NTP timestamp indicate seconds (and the least significant bits indicate the second fractional part), the use of the value in this field as a marker identifier may limit the number of markers to at most one per second.

An IDMS scheme based on the NTP timestamp field as a marker identifier may be implemented without any additional measures if the "marked" content part, i.e. the content part identified by the RTP timestamp in the RTP timestamp field of the SR, across the RTP streams are sent out at the same time. This may e.g. be the case when a single media source sends the same content in different unicasts to different receivers, but transmits the same content parts at the same time in the different streams. If that, i.e. the NTP timestamp not being the same for the same content parts in different streams, is not the case, the marker identifier (i.e., the NTP timestamp) will be different for the same content part. In that case, additional measures may resolve this issue, e.g. by implementing the MSAS as part of the media source or by informing the MSAS which marker identifiers belong together.

Further, in an embodiment, if an RTCP packet refers to an RTP timestamp that is used for more than one packet, the synchronization client may only report on timing information associated with the first RTP packet comprising the RTP timestamp. Hence, if e.g., a single video frame is carried in multiple RTP packets, this rule may allow more accurate reporting on packet arrival time.

FIG. 11 depicts a way of associating a synchronization marker to a content part according to another embodiment of the invention. In particular, FIG. 11 depicts another use of the RTCP protocol to mark a content part in an associated RTP packet. In this case, the data structure depicted in FIG. 11 defines a new RTCP XR block for identifying a marked content part. Such XR block may be appended to a conventional Sender Report (SR) and comprise an RTP timestamp referring to a particular RTP timestamped RTP packet in the associated RTP stream. However, instead of using the "NTP timestamp, most significant word" value as a marker identifier (as described with reference to FIG. 10), an XR block appended to an SR may comprise a marker identifier. This scheme has the advantage that the content source does not need not to synchronize the output streams to various receivers, provided that the content source associates the same marker identifier to the same content part in the different streams transmitted to the receiver. This also means that the content source may sent SRs, including the new RTCP XR block, for the same content part to the various receivers, i.e. SRs to the various receivers are sent for the same content parts, and these SRs sent for the same content parts contain the same marker identifier in the new RTCP XR block.

The XR block depicted in FIG. 11 may be defined in accordance with IETF RFC 3611. Hence, the first two 32 bit words 1102,1104 may define the general XR header and the last two 32 bit words 1102,1104 may comprise a field 1106 comprising a block type value for identifying the marker block. A (8 bit) marker field 1108 may define the type of marker or marker identifier and a block length field 1110 may define the block length. In the example, the block length may be set to "1" (or 00000001 in bit representation) identifying that the block comprises an additional 32 bit word comprising the marker identifier 1112.

Figure 12:
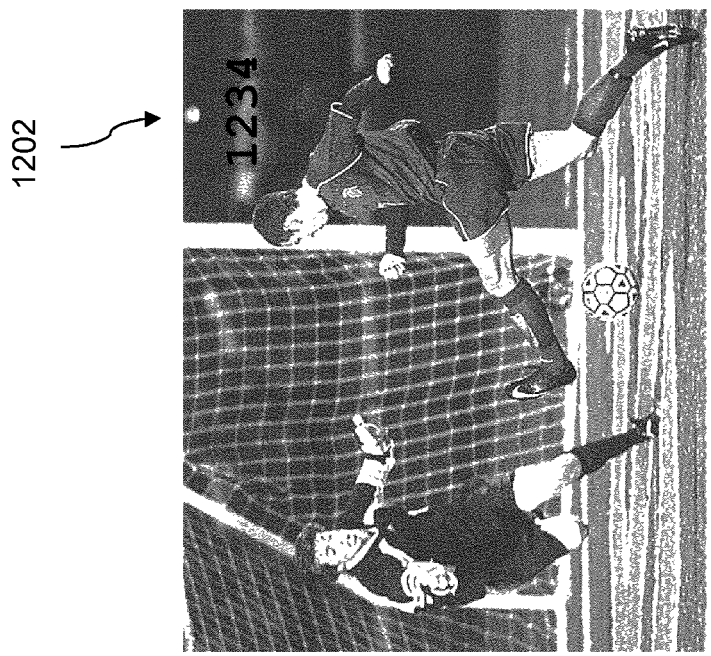
FIG. 12 shows an exemplary watermark-based marker, according to one embodiment of the invention.
Figure 12:

FIG. 12 depicts a way of associating a synchronization marker to a content piece according to yet another embodiment. In particular, FIG. 12 depicts the use of a watermark as a synchronization marker. A watermark may be inserted into the actual content part, e.g. at least part of the video frame or audio sample, itself. In one embodiment, the watermark may carry a marker value, e.g. "1234", 1200 inserted into a video frame 1202, resulting in a watermarked video frame 1204. In one embodiment, the marker is configured such that the watermark is not or at least a little visible to the user when played-out. Conventional well-known watermark techniques may be used. For an overview of watermarking technology reference is mad to I. J. Cox et al., "Digital Watermarking and Steganography", Morgan Kaufmann, 2nd edition, ISBN 978-0-12-372585-1, 2008. Many watermarks are designed with a certain robustness in mind, i.e. meaning that they remain usable even after the content undergoes changes such as cropping, transcoding, resizing, quality degradation, etc.

Figure 13:
FIG. 13 shows an illustrative variation of combining different types of markers, according to one embodiment of the invention.

A watermark-based marker may be carried in the content part instead of information in the header of a particular protocol (as described e.g. in FIG. 5). This way, the marker is not affected by the use of different streaming protocols. For instance, an IDMS system based on a watermarking-based marker allows inter-destination synchronization of streams different transport protocols, such as RTP and HAS. In another instance, a watermarking-based marker works for media content that is encoded using different codecs FIG. 13 depicts a way of associating a synchronization marker to a content part, according to one embodiment of the invention. In particular, in this embodiment a watermark identifying a marker value may be inserted in a content part while the same content part, image frame, may also be marked by an extended RTP packet as described with reference to FIG. 9, i.e. an RTP packet wherein the extension bit field is set to "1" indicating that the header is extended by, in this case, an IDMS marker having a marker value "1234". This way, different streams may be marked at different (protocol) layers using different types of markers, and one stream may also be marked at different layers as well. Using such marked content, a first receiver may detect markers as part of the RTP headers, and a second, different type of receiver may detect markers as watermarks in the actual content. When detecting and reporting these markers (for example marker identifiers) to the synchronization server (comprising the synchronization function according to the invention), synchronization of the play-out of the content may be achieved.

Figure 14:
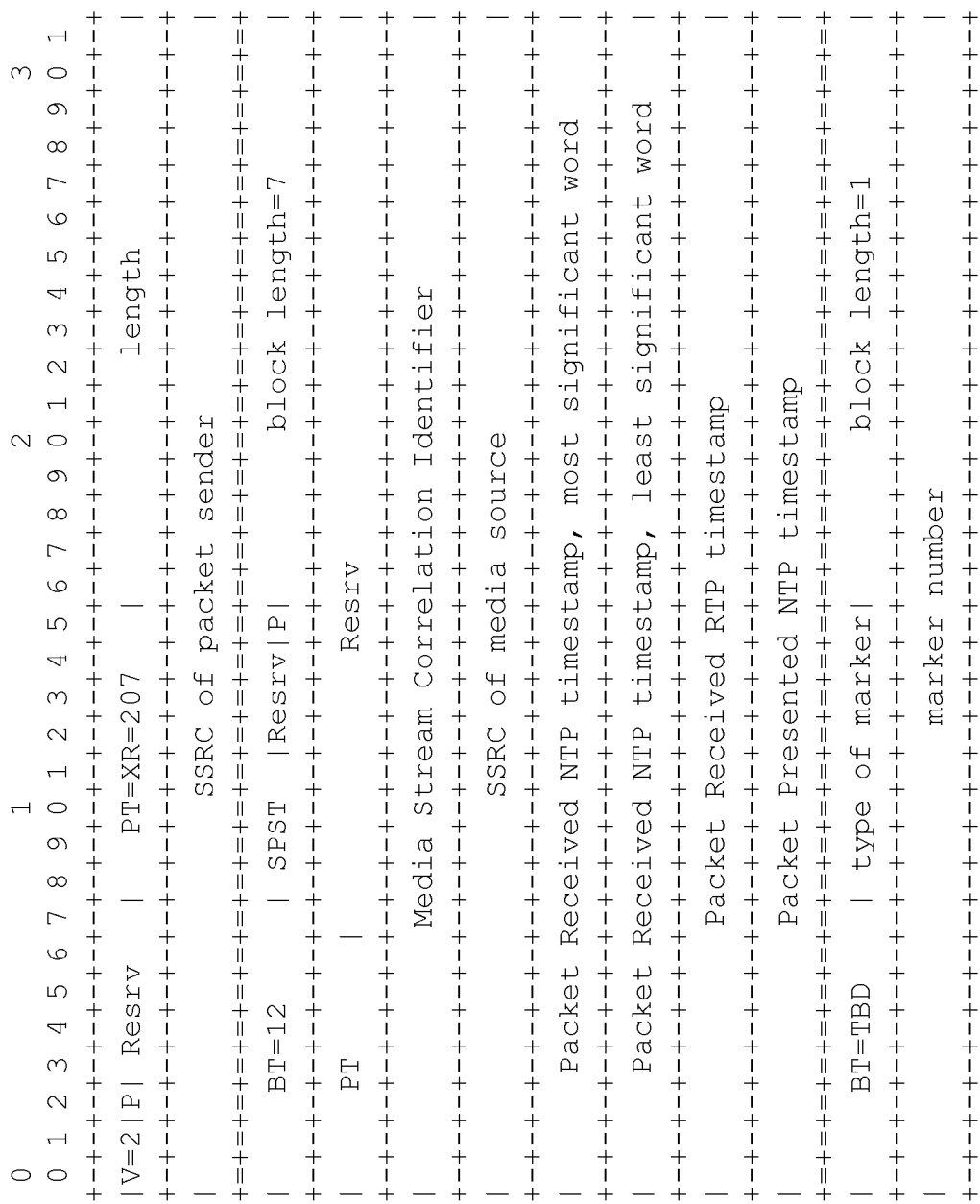
FIG. 14 shows an illustrative synchronization status report, according to one embodiment of the invention.

FIG. 14 depicts a data structure for transmitting timing information to the synchronization server according to an embodiment of the invention. In particular, FIG. 14 depicts a synchronization status report in accordance with a format as specified ETSI TS 183 063 version 3.5.2, which is extended with marker information such as a marker identifier.

The timing information may be generated by a client in response to the detection of a marker associated with a content part, i.e. a video frame and/or an audio sample. Timing information may include timing information associated with the reception of a marked packet by the client, e.g., an RTP timestamp ("packet received RTP timestamp") and an NTP timestamp ("packet received NTP timestamp"). Alternatively and/or in addition, the timing information may comprise timing information associated with the play-out of a packet, e.g. a presentation timestamp ("packet presented NTP timestamp").

Further, similar to the data structures depicted in FIGS. 9-11 and 13, the report may be extended by marker information, including a data field associated with the type of marker, a block length field and a marker identifier field. In this way, SCs can report on a specific marker to the MSAS. The term timing information may for the purpose of this invention also comprise marker information such as a marker, preferably a marker identifier.

On the basis of the information in the synchronization status reports, the synchronization server may send synchronization settings instructions back to the client. These instructions may comprise the marker identifier and synchronization information. The synchronization setting instructions may have a similar format as the extended synchronization status report depicted in FIG. 14.

Figure 15A:
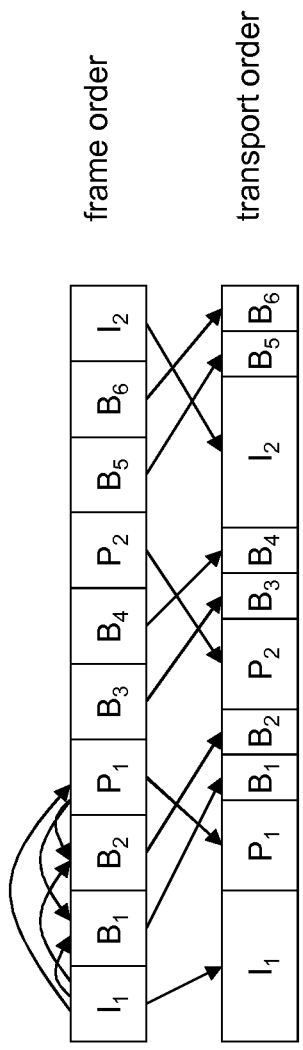
FIG. 15A-B show illustrative streams with different Groups of Picture (GOP) sizes, according to one embodiment of the invention.
Figure 15B:
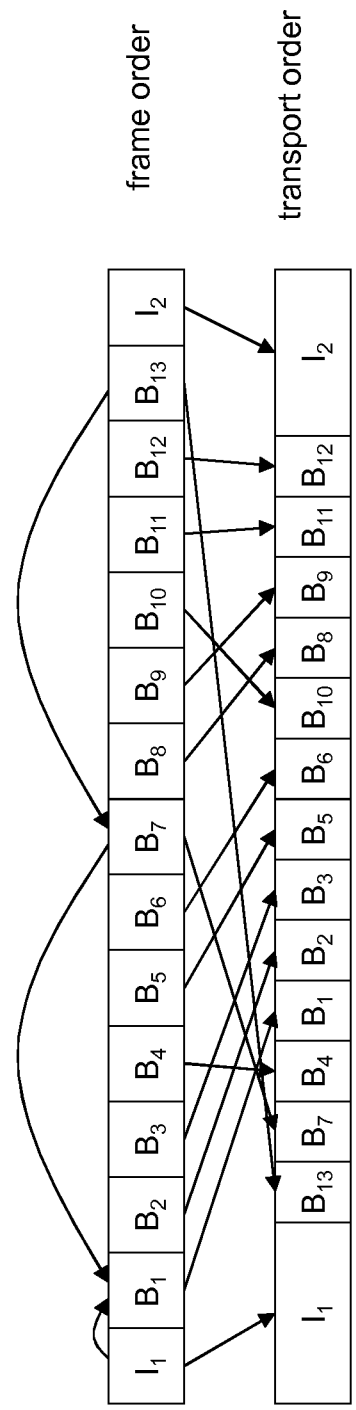

In some situations, there may be a discrepancy between the order video frames are transported and played-out (i.e. presented to the user), e.g. in the case of MPEG interpolated video. This situation is schematically illustrated in FIGS. 15A and 15B depicting MPEG-2 or H.264 coded transport streams with different Groups of Picture (GOP) sizes and GOP structures. A GOP may be regarded as a sequence of frames that can be decoded on the basis of the information within that GOP, i.e. for the decoding of certain frames in a certain GOP there is a dependency on certain other frames in that same GOP, meaning these other frames need to be available before able to decode that certain frame. The types of frames and their location within a GOP can be defined in a particular temporal sequence. Different streams may have different GOP sizes and/or different sequences of different frame types. A frame in a GOP may relate to an independent I-frame, a prediction P-frame and a bi-directional B-frames. I-frames are decoded independently from other frames. In contrast, P- and B-frames are dependent on other frames and thus should be decoded according to this predetermined dependency.

The first stream shown in FIG. 15A comprises a first GOP structure $I_1B_1B_2P_1B_3B_4P_2B_5B_6$ of GOP size 9 wherein the I,B and P frames are ordered to provide an efficient frame transport, which may speed up the decoding process and allow the use of a relatively small buffer size at a receiver so that not all frames need to be buffered before starting the decoding process. This way, frames may be transmitted to a receiver in a different order than the actual play-out order: e.g. $P_1$ is needed for decoding purposes earlier than $B_1$ and $B_2$, so it is sent earlier. Similarly, other frames may be sent later, but displayed earlier. During the decoding, the frames are buffered and reordered in accordance with the play-out time. This reordering may take some time so that reception time of a packet cannot be regarded as an accurate measure for the play out time. Therefore, an IDMS system using timing information based on the receipt time of an MPEG type packets may be inaccurate.

FIG. 15B depicts a second stream having a different GOP structure and GOP size (GOP size 14) compared to the first stream in FIG. 15A transmitted to a first receiver. In this particular case, the second stream may be an H264-based stream comprising a second GOP structure comprising only 1-frames and B-frames but no P-frames: $I_1B_1B_2B_3B_4B_5B_6B_7B_8B_9B_{10}B_{11}B_{12}B_{13}$. In this case, the B-frames may also be used as reference frames for other frames. $B_7$ is dependent for decoding on $B_{13}$ and $B_1$ is dependent for decoding on $B_7$, so in essence, $B_1$ is dependent on $B_{13}$ for decoding.

If the $10^{th}$ frame in the first GOP structure ($I_2$) and the $10^{th}$ frame in the second GOP structure ($B_9$) carries the same video frame, it can be seen from FIGS. 15A and 15B that $I_2$ in the first stream is sent earlier to the receiver because $I_2$ is needed to decode $B_5$ and $B_6$. Further, in the second stream, $B_9$ is sent later, because of its dependency on a number of other frames in the second stream. So, if the FIG. 15A stream is of a media stream to receiver A and the FIG. 15B stream is of a media stream to receiver B, and if all other things (such as media transmission and transport delays) are equal, receiver A may receive and decode frame $I_2$ earlier then receiver B may receive and decode frame $B_9$, but keeps it buffered because it is not scheduled for playback until after reception and decoding of frame $B_5$ and $B_6$. In contrast, frame $B_9$ does not have to 'wait' for playback after decoding. Hence, the reception of the $10^{th}$ frame in the sequence is not aligned between receivers A and B, and if IDMS is based on packet received times, this will lead to a certain inaccuracy of the synchronization achieved.

Depending on the requirements however, such inaccuracies as described may be acceptable. For example, it is known that for social TV applications even a delay difference of a second is not noticeable to many users so that misalignment of I frames due to differences in receipt and play-out times may be tolerated.

If the accuracy needs to be increased, the IDMS system may be configured such that a client reports on the presentation time of a marked frame (marked content part), e.g. the time that a frame in a marked packet or a watermarked frame is played-out. Because frames are put in the original order again before play-out, reporting on presentation time circumvents the problem caused by interpolated video encoding.

Another way to avoid problems associated with the frame order caused by frames that depend on other frames (such as B-frames and P-frames as described above), markers may be inserted in I-frames.

For example, in one embodiment (certain) I-frames in the different media streams may be aligned and marked at the source using any of the suitable marking methods described herein. I-frames are suitable for marking because as opposed to B-frames or P-frames, I-frames in a stream are always processed and play-out in order of reception by the receiver as they are not dependent on other frames for decoding.

For example, the streams in FIGS. 15A and B have GOP sizes as 9 and 14 respectively, so each 126 frames (9×14) the I-frames of both media streams are aligned again. Assuming a frame rate of 25 frames per second, approx. each 5 seconds the source may insert a marker in the I-frame of the different stream, in a way that the insertion is aligned across the streams. This may be sufficient for certain IDMS applications.

As a further measure to increase the accuracy of the synchronization, a time value, preferably in the form of a timestamp may be inserted in the markers. In other words, the markers become timestamps for the purpose of IDMS. For example, if a marker field comprises e.g. 4 digits, 3 digits could be used for representing a time value in seconds, and the 4th digit may be used for fractions. Thus, the marker represents a timestamp with a value between 0.0 and 999.9 seconds. If both receivers sent their synchronization status reports, including the marker identifier, to an MSAS (wherein the MSAS comprises a synchronization function according to the invention), the MSAS may determine the time between the two frames reported upon based on the difference of the respective IDMS markers. E.g. if a first receiver reports on a packet received time of 12:34:56.000 and includes a Marker 123.4 and a second receiver reports on a packet received time 12:34:57.000 and includes a marker 125.7, the MSAS can determine that the second receiver reports on a packet that is 2.3 seconds ahead in the content. So, a simple synchronization calculation in this case may be: 12:34:57.000−12:34:56.000+125.7−123.4=1.3 seconds, meaning the second receiver is 1.3 seconds ahead of the first.

From the above, it follows that synchronization may be achieved at various accuracies depending on the application and the implementation. A very high synchronization level relates to asynchronies lower than 10 ms. This level of synchronization is required for different audio outputs located at a single physical location. Typical application relate to networked stereo loudspeakers, phased array transducers and video walls.

High synchronization levels relate to asynchronies between 10-100 ms. This level of synchronization is required for applications wherein fairness is an important requirement, wherein the response times of the users may not be influenced too much by delay differences of media play-out to which users respond. Typical applications relate to: distributed tele-orchestra, networked quiz shows, networked real-time multiplayer games, multiparty multimedia conferencing, game-show participation.

Medium synchronization levels relate to asynchronies between 100-500 ms. This level of synchronization is sufficient for applications wherein various related media items are displayed simultaneous but without real-time requirements, such as lip-sync. Typical applications relate to: synchronous e-learning, presence-based games, consumer-originated content, on-line election events and second screen sync.

Finally, low synchronization levels relate to asynchronies between 500-2000 ms. This level of synchronization is sufficient for applications wherein media is consumed by different users at different physical location, but the nature of the interaction level between users is not of very competitive nature. Here applications relate to seamless switching among media devices, shared service control and social TV.

Figure 16A:
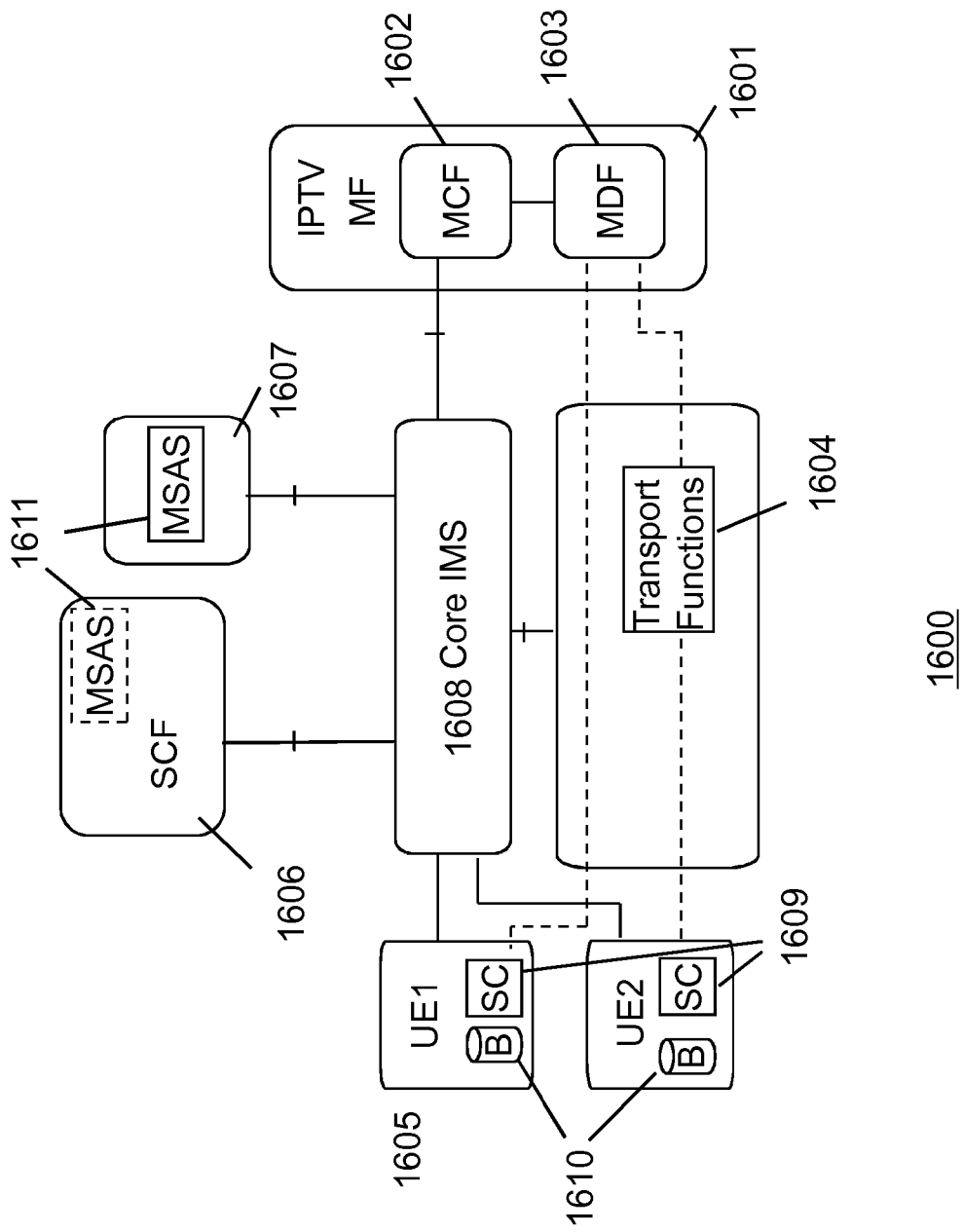
FIG. 16A-B shows an illustrative messaging diagram for use in relation to Session Description Protocol (SDP), according to one embodiment of the invention.
Figure 16B:
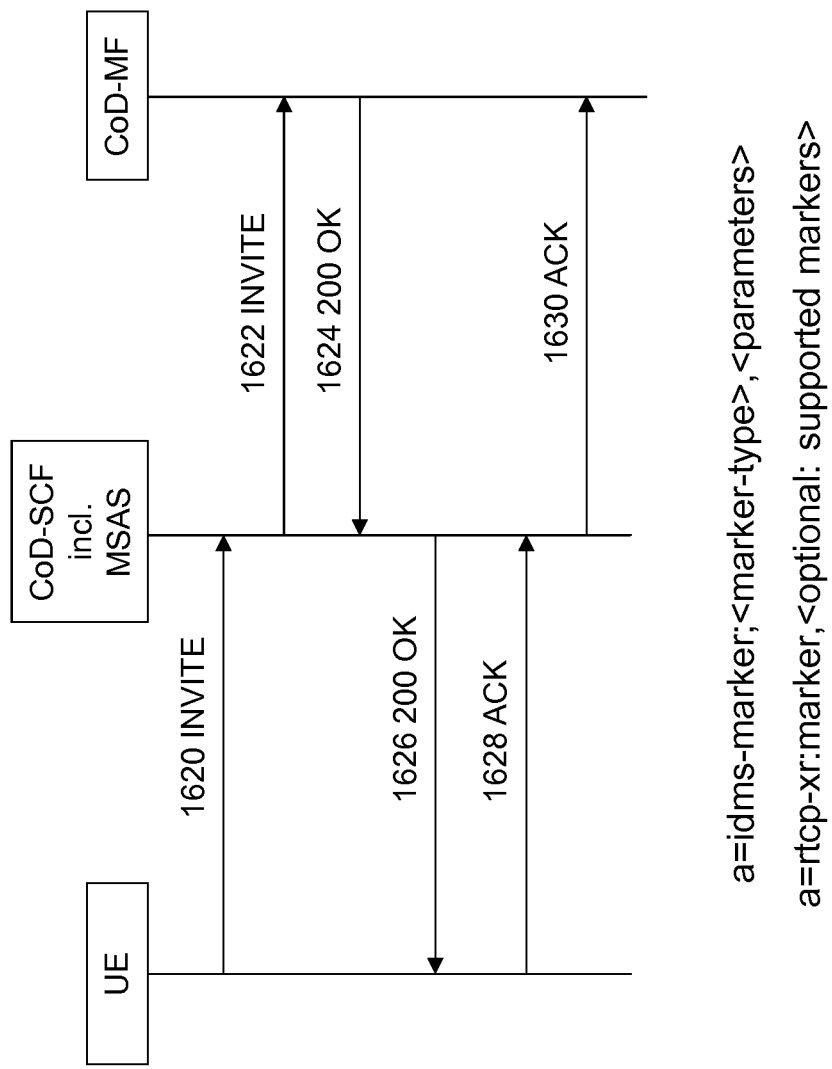

FIGS. 16A and 16B show a marker-based synchronized IPTV system and a protocol flow associated with such IPTV system respectively according to one embodiment of the invention. In particular, FIG. 16B the protocol flow depicts the establishment of a marker-based synchronized IPTV session on the basis of protocol messages, in this case e.g. using SIP and SDP (Session Description Protocol), in order to exchange certain parameters between a synchronization client and an MSAS which is implemented in the IPTV system.

The IMS-based IPTV system 1600 depicted in FIG. 16A may related to an IPTV system as specified in ETSI TS 182 027 version 3.5.1. The IPTV system 1600 may comprise an IPTV Media Function (MF) 1601, comprising a Media Control Function (MCF) 1602 and a Media Delivery Function (MDF) 1603. The IPTV system further comprises Transport Functions (TF) 1604, User Equipments (UE) 1605, an IPTV Service Control Function (SCF) 1606, at least one application server (AS) 1607 and an IMS core network (Core) 1608. A Synchronization Client (SC) 1609 may be part of an UE 1605 or be part of the Transport Functions 1604. If the SC is implemented in UEs, these UEs also comprise a variable delay buffer 1610. The MSAS 1611 may be included in the SCF 1606 but could also be implemented on a stand-alone application server 1607. The MSAS and the SCs are configured to synchronize marked content streams transmitted by the MDF to the UEs as described above with reference to FIG. 2-14.

The IPTV system may use the Session Initiation Protocol (SIP) to set up and control sessions between user terminals or user terminals and the applications servers comprising the SCFs and MFs. The Session Description Protocol (SDP) carried by SIP signaling is used to describe and negotiate the media components in the session. Further, the Real Time Streaming Protocol (RTSP) is used for media control providing e.g. broadcast trick modes, Content-on-Demand (CoD) and Network Personal Video Recorder (NPVR) and the Real Time Transport Protocol (RTP) is used for media transport.

The protocol flow for a typical session setup in IMS-based IPTV of a synchronization session is described with reference to FIG. 16B. In this example, a synchronized Content-on-Demand (CoD) session is illustrated. The process may start with the UE sending a request, e.g. an SIP INVITE, to the SCF (step 1620). The SCF may forward the request to the MF, i.e. the media source (step 1622), which confirms the reception of the request with a 200 OK response (step 2026). This response is then forwarded to the client (step 2028), after which an ACK is sent back again.

During the session set-up the signaling messages, e.g. the SIP request and response messages (SIP INVITE and 200 OK) may include an SDP attribute (Session Description Protocol) that indicates that the user equipment wants to perform inter-destination synchronization, and typically includes a unique group identifier (e.g., SyncGroupID). All user equipments that need (or desire) to be synchronized share this group identifier. The use of a group identifier is specified in ETSI TISPAN TS 183 063 version 3.5.2.

If markers are to be used for synchronization, this can be signaled during the synchronization session setup. To signal the use of markers, predetermined SDP attributes may be added to the messages that are exchanged. FIG. 16B illustrates two examples of such SDP attributes. For example, in one embodiment, the attribute "IDMS-marker" may indicate that markers are supported by the IDMS system. In another embodiment, the "IDMS-marker" attribute may determine which types of markers are supported, and, optionally, which parameters are associated with these type of markers.

Hence, in the protocol flow of FIG. 16B a negotiation between user equipment and media function can be realized wherein the user equipment may send a SIP request via the MSAS to the MF wherein the SIP request comprises synchronization session information indicating what marker-type (or which marker-types) are supported by the UE. In this example, the MF may then choose a marker type, provided that it supports at least one of the same markers as the UE. Alternatively, the MF may propose various supported marker types and the UE may then choose the marker type to be used for the synchronization session.

In a further embodiment, the synchronization session information may comprise an attribute "RTCP-XR: marker" indicating that the RTCP XR marker block (as discussed with reference to FIG. 11) is used for marking content parts. Further information may be added, e.g., the supported marker type(s) may be indicated in such an SDP description.

Figure 17:
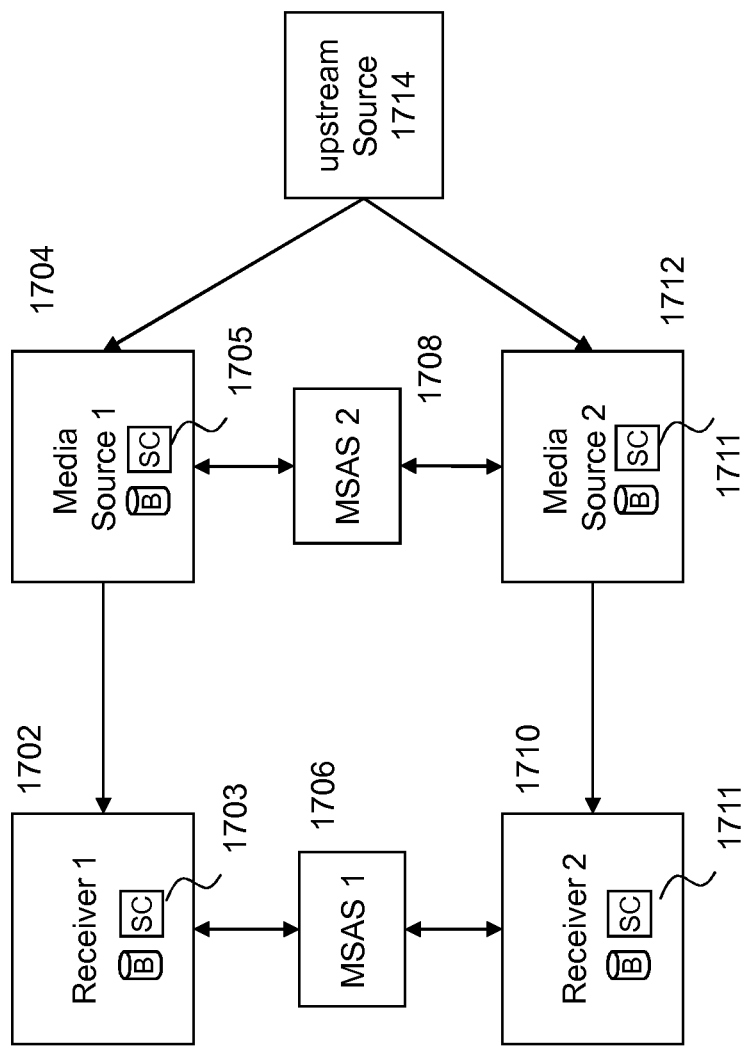
FIG. 17 shows an illustrative embodiment involving multiple media sources, according to one embodiment of the invention.

FIG. 17 depicts a marker-based IDMS system, according to yet another embodiment of the invention. In particular, FIG. 17 depicts a marker-based IDMS system comprising multiple media sources. This particular embodiment, a first receiver 1702 comprising a first synchronization client 1703 may receive a first marked stream generated by a first media source 1704 and a second receiver 1710 comprising a second synchronization client 1711 may receive second marked stream generated by a second media source 1712 wherein the first and second stream carry the same content and comprise markers marking the same content parts (e.g. video frame and/or audio samples) in the first and second stream. Synchronization of the play-out of the marked streams is realized by a first IDMS system comprising synchronization clients in or associated with the receivers which are configured to transmit timing information, possibly including marker identifiers, to a first MSAS1 1706 and to receive synchronization information from the first MSAS1.

In order to enable the media sources to mark the same content parts, the first and second media sources are coupled by a further, second IDMS system comprising first and second media source synchronization clients 1705,1711 respectively in or associated with the first and second media source and a second MSAS2 1708. Here, first and second media sources may receive content from a further, upstream source 1714. Hence, the second IDMS system may be used to exchange information between the two media sources on the placement of markers in the media streams. Further, the second IDMS system may be used to exchange information between the two media sources on the generation and transmission of marked content parts in the first and second stream in a similar way as the first IDMS system is used to synchronize the play-out of the streams at the clients.

The main function of the second IDMS system is that the markers in the first and second stream are inserted in such a way that the markers mark the same content parts. A further function of the second IDMS system may be very "low-level" synchronization of transmission of the marked streams. The two receivers will finally perform their own synchronization, so any lack of synchronization upon transmission by the first and second media source will not lead to a same lack of synchronization ultimately.

In one embodiment, the first and second media sources and the second MSAS may be configured to set up a synchronized media stream generation session in order to configure the media sources to generate a marked content stream comprising markers marking the same content parts (e.g. video frames and/or audio samples). During the set-up of this session, the MSAS and the clients in the media sources may negotiate the particular marking scheme, including: marker-type, frequency of marker insertion, etc. (similar to the situation in FIG. 16 above).

To ensure that the markers in the first and second stream mark the same content part, the media sources may insert markers in positions indicated by the second MSAS as part of the synchronization settings instructions transmitted to the media sources. The second MSAS may add e.g. an RTCP XR marker block to its synchronization settings instructions, indicating that the referenced packet in its instruction may be marked with the marker indicated in the XR marker block.

The marker-based IDMS system in FIG. 17 may be advantageously used in a so-called content delivery network (CDN), which is configured to efficiently deliver content to multiple receivers. A CDN may for example receive content from a content provider and store multiple copies of the content at multiple delivery nodes in the CDN so that bandwidth problems may be reduced and efficient delivery is guaranteed. A CDN control function (CDNCF) may centrally manage the storage of the content at the different delivery within the CDN and the delivery of a particular content item, i.e. video title, by a delivery node to a receiver.

Hence, in that case, the first and second media server in FIG. 17 may be regarded as a first and second delivery nodes associated with a CDN and managed by a CDNCF (not shown) and the MSAS may be integrated in or associated with the CDNCF. Further, the CDNCF may be configured to set up a synchronized media stream generation session in order to configure delivery nodes to generate a marked content stream for delivery to a plurality of receivers in a similar way as described above with reference to FIG. 17. Alternatively, a CDN may insert markers, e.g. using the watermark-based markers, at the ingress point of the CDN. This causes all the nodes in the CDN to have the same markers in the same content positions, and thus IDMS can be performed by receivers based on these markers.

Figure 18:
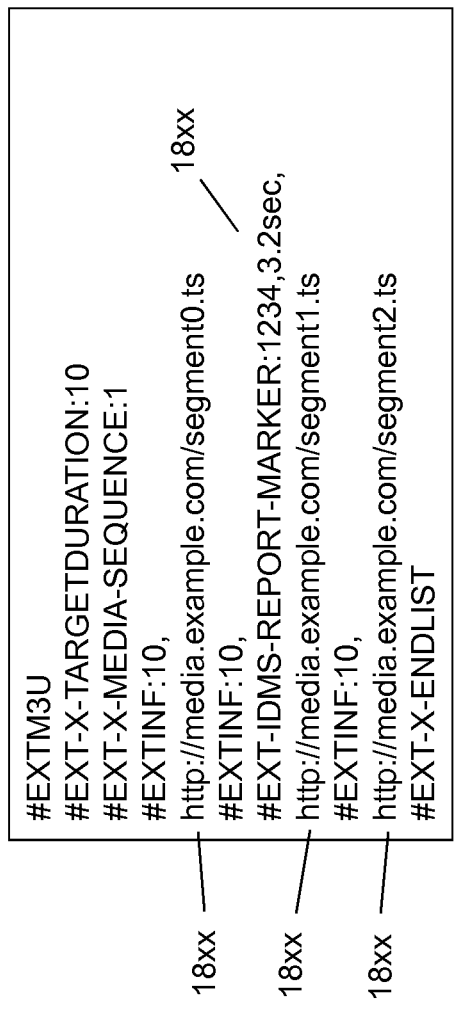
FIG. 18 depicts a data structure of a manifest file comprising marked segments according to one embodiment of the invention.

FIG. 18 shows an embodiment of using a marker-based IDMS system with a segmented content according to one embodiment of the invention. In particular, FIG. 18 depicts an example of a manifest file defining segments files for use with an HTTP Adaptive Streaming (HAS) protocol. In segmented content streaming, such as the HAS streaming protocol, content is divided in so-called segment files (in short "segments") wherein a typical segment may include a number of frames that corresponds to 2 to 30 seconds of play-out time. HTTP adaptive streaming (HAS), Scalable Video Coding (VCS) and spatially segmented content (e.g. tiled video) use segmentation on the basis of time, quality and space respectively. Segmented video content may be used to dynamically adjust the bandwidth requirements, e.g.

by switching from a high to a low quality video stream. Moreover, segmented video may also allow division between popular and less popular video segments. For example, typically content associated with the beginning of a video will be watched more often (more popular) than content at the end. Similarly, low-bitrate lower-quality video content (e.g. the lowest resolution HAS segments or the SVC base layer) will be watched more frequently than high quality content (e.g. higher-resolution HAS segments or an SVC enhancement layer).

The relation between segments is laid-down in a so-called manifest file comprising a sequence of segment identifiers and references (e.g. URLs) to locations of network nodes, which are configured to deliver these segments. The relation between the segments may be a temporal relation, a spatial relation or a quality. A client in a receiver uses the manifest file for requesting media server in the network to deliver a particular segment. The process of requesting and delivering a segment to a client may be repeated until the last segment in the manifest file is played-out.

In order to synchronize the play-out of segments by a receiver, a synchronization client implemented in said receiver may report timing information associated with the processing of the segments by the HAS client to the MSAS (wherein said MSAS comprises a synchronization function according to the invention). As segments are "pulled" by a HAS client instead of "pushed" to a HAS client, in one embodiment the synchronization client may report on the presentation time or play-out time or receive time of a segment by the receiver. This presentation time may be referred to as the segment presentation time. Presentation time is more relevant than segment receive time, because clients pull (or request) segments, and thus segment receive times are very much dependent on the time the requests have been made. Still segment receive times may be used as well, although perhaps with less synchronization accuracy as a result.

Further, as a typical segment comprises a number of frames corresponding to a play-out time between approx. 2 and 30 seconds, considerable less reports are sent to the MSAS when compared with an RTP streaming scheme, if a report is sent for each HAS segment or RTP packet, respectively. This however does not seriously affect the accuracy of the synchronization since in a streaming scheme the difference in play out time between clients is not only a function of the network delays (as is the case with RTP). If a client needs to receive a segment earlier, it may request it earlier. HAS-based IDMS is therefore far less likely to require frequent synchronization adjustments.

If a client receives synchronization information comprising a target presentation time of a segment from the MSAS, it makes sure that this segment is requested on time (of course, with live content, there is a limit as to how early a client can request a segment).

A synchronization client may report timing information on each segment. Depending on the segment length, this would mean that the client transmits every 2 to 30 seconds a report to the MSAS. If the report transmission frequency is too high, in one embodiment, markers, preferably as flags or marker identifiers may be inserted in a manifest file, being associated with segments through their association in the manifest file with the segment identifiers.

FIG. 18 depicts a data structure of a manifest file comprising marked segments according to one embodiment of the invention. The manifest file may comprise a number of references 1802,1804,1806 (e.g. URLs) to locations where a particular segment can be retrieved. The example in the figure refers to three segments rmedia.example.com/segment0.ts, rmedia.example.com/segment1.ts and rmedia.example.com/segment2.ts, wherein the second segment is marked using a marker tag IDMS-REPORT-MARKER 1808, triggering the synchronization client in the receiver to report on the segment presentation time of this particular segment, e.g. when starting the play-out of this segment. Similar to the previously described marker types, the marker tag may be used with one or more marker parameters or "flags". In one embodiment, a marker parameter may relate to a marker identifier (e.g. "1234" as depicted in FIG. 18). In another embodiment, a marker parameter may relate to a time parameter indicating at what time since the start of the play out of the segment the marker should be reported to the MSAS.

FIG. 19A-C shows illustrative variations of an IDMS system, according to one embodiment of the invention. The MSAS is may be realized as a functionality suitable for providing IDMS for a plurality of synchronization clients in a synchronization group. The MSAS functionality may be implemented in at least one part(s) of the IDMS system.

FIG. 19A depicts an embodiment wherein MSAS 1910 is at least partially implemented in a media source 1908. Alternatively, the MSAS may be at least partially implemented in the media source 2012. First and second receivers 1902,1904 may exchange synchronization messages with the MSAS as described with reference to FIG. 2.

Alternatively, the embodiment in FIG. 19A may be used to synchronize a marked content stream with an unmarked stream. For example, first media source 1908 may transmit a unmarked media stream, e.g. an RTP stream, to a first receiver 1902 in a similar way as depicted in FIG. 1. In that case, a synchronization client in the first receiver may transmit first timing information, e.g. a clock time and a RTP time stamp, to a synchronization function in the MSAS. Further, as the MSAS is (at least partially) implemented in the media source transmitting the unmarked media stream, the synchronization function has access to information on the unmarked media stream, in particular the RTP timestamp offset and the data (content)transmission rate associated with the unmarked media stream. Based on the received RTP timestamp (content part), the data (content) transmission rate (for example as number of transmitted RTP packets per second), and the RTP time stamp offset, the synchronization function is able to determine the position of the content part of which the clock time is reported, in the unmarked content stream. The position may for instance be determined as number of seconds from the start of the stream.

A second media source 1912 may transmit a marked media stream to second receiver 1904 in a similar way as depicted in FIG. 2. A synchronization client in the second receiver may transmit second timing information, e.g. a clock time and marker identifier, to the synchronization function in the MSAS. The marked content may be prepared such that markers may be associated with content parts at predetermined positions in the media stream, for instance by inserting the markers at these predetermined positions in the content stream. This information about the position of the marked content parts may be provisioned to the synchronization function before synchronization is started.

For example, a marker may be inserted at the start of the media stream and subsequent markers may be periodically inserted in the stream (wherein each subsequent marker, preferably a marker identifier, has an increased value and wherein the distance between different markers may be defined in terms of a time unit or for example number of packets). This way, the synchronization function may periodically receive timing information associated with marked content parts from the second synchronization client. The synchronization function in the MSAS may then determine a timing difference on the basis of the first and second timing information, taking into account the positions of the content parts of which the timing information is reported. Subsequently the synchronization function may transmit synchronization information to the first and/or second synchronization client in order to synchronize the play-out of the receivers.

Although, synchronization is described on the basis of the embodiment of FIG. 19A, other embodiments wherein the MSAS is not implemented in a media source is also envisaged (e.g. implementation as described in FIG. 2 or FIGS. 19B and 19C hereunder). In that case, before synchronization is started, the synchronization function may be provisioned with all information needed in order to perform inter-destination synchronization as described above (e.g. RTP time stamp offset and transmission rate of the unmarked media stream and information on the position of the markers in the marked stream) in any feasible way. For instance the receiver or transmitter of the unmarked stream may report on the data (content) transmission rate to the synchronization function. Alternatively the synchronization function may be implemented in a device receiving the unmarked content stream as well, and is configured to determine the rate, for instance by simple measurements of the number of RTP packets received per time unit. The advantage of such hybrid solution is that terminals not configured for reporting timing information, based on markers, may still be synchronized with terminals that are configured to report timing information based on markers associated with content parts, and/or configured to report marker notifications of markers associated with content parts.

FIG. 19B depicts an embodiment wherein the MSAS 1914 is at least partially implemented in a first receiver 1916. In that case, the communication between the SC and the MSAS is internal to the receiver. The MSAS may generate synchronization status information within receiver, and perform synchronization calculations using synchronization status information in synchronization status reports transmitted from a second receiver 1918. If appropriate, the MSAS may then execute synchronization settings instruction if receiver is, e.g., delayed in its play-out. If the second receiver 1918 is delayed in its play-out, the first receiver may receive synchronization settings instructions from the MSAS.

FIG. 19C depicts an embodiment wherein the MSAS 1930 implemented as a separate entity separate from the content sources 1934,1936 and receivers 1926,1928.

With some modifications, one skilled in the art may extend the embodiments described herein to other architectures, networks, or technologies. For instance, the disclosure here relates generally to the synchronization maestro scheme, where all receivers send their status reports to a master. This master determines the synchronization settings instruction needed for IDMS and transmits the synchronization settings to the appropriate receivers. However, the disclosed methods and systems may also be used (or adapted) to other schemes. In one instance, a master-slave receiver scheme may be used. One receiver (the master receiver) may send its synchronization status reports to all other receivers (the slave receivers). The other receivers then adjust the play-out according to those synchronization reports. In another instance, a distributed control scheme maybe used, where all receivers exchange synchronization status reports and each receiver determine based on all the received status reports how to adjust its own play-out.

One embodiment of the disclosure may be implemented as a program product for use with a computer system. The program(s) of the program product define functions of the embodiments (including the methods described herein) and can be contained on a variety of computer-readable storage media. The computer-readable storage media can be a non-transitory storage medium. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory, flash memory) on which alterable information is stored.

It is to be understood that any feature described in relation to any one embodiment may be used alone, or in combination with other features described, and may also be used in combination with one or more features of any other of the embodiments, or any combination of any other of the embodiments. Moreover, the invention is not limited to the embodiments described above, which may be varied within the scope of the accompanying claims.

The invention claimed is:

1. A method for enabling inter-destination synchronization of processing of content of at least a first media stream and a second media stream, wherein one or more content sources transmit said first media stream and said second media stream as marked streams associated with one or more markers for marking one or more content parts of said first media stream and said second media stream respectively, said method comprising:
   using a first marker to detect a first marked content part of said first media stream and using a second marker to detect a second marked content part of said second media stream, said first and second marked content part being associated with the first and second marker respectively;
   responsive to the detection using the first marker, associating first timing information, comprising a first clock time, with said detected first marked content part and, responsive to the detection using the second marker, associating second timing information, comprising a second clock time, with said detected second marked content part;
   determining a timing difference on the basis of said first and second timing information; and
   generating, on the basis of said timing difference, synchronization information, said synchronization information enabling at least one of a first device or a second device, comprising a first synchronization client or a second synchronization client respectively, to adjust the processing of content of at least one of said first media stream or said second media stream respectively.

2. The method according to claim 1 wherein said one or more markers comprise a marker identifier for identifying markers associated with marked content parts of said first and second media stream, said method further comprising:
   comparing a first marker identifier associated with said first marked content part with a second marker identifier associated with said second marked content part.

3. The method according to claim 2, further comprising:
if said first marker identifier is identical to said second marker identifier, determining said timing difference on the basis of said first and second timing information; and
if said first marker identifier is not identical to said second marker identifier, determining said timing difference on the basis of said first and second timing information and on the basis of a temporal relation between said first marker identified by said first marker identifier and said second marker identified by said second marker identifier.

4. The method according to claim 1 further comprising:
providing said first timing information from a first receiver to a synchronization function, said first receiver being configured for receiving the first media stream and including a first synchronization client; and
providing said second timing information from a second receiver to said synchronization function, said second receiver being configured for receiving said second media stream and including a second synchronization client, said synchronization function being implemented in one of: a synchronization server, the one or more content sources adapted for transmitting said first and said second media stream to said first and second synchronization client, or a receiver associated with at least one of said first synchronization client or said second synchronization client.

5. The method according to claim 1, wherein said one or more markers comprise a marker identifier for identifying markers associated with marked content parts of said first and second media stream, and a first marker identifier is associated with said first marker content part, the method further comprising:
said first synchronization client transmitting said first timing information to a synchronization function;
transmitting a request for said second timing information to said second synchronization client, said request comprising said first marker identifier; and
in response to said request, said second synchronization client transmitting said second timing information to said synchronization function.

6. The method according to claim 1 comprising:
receiving said first media stream at a first receiver comprising a first synchronization client;
transmitting a first marker notification associated with said first marked content part to a device comprising a synchronization function, said first marker notification comprising a first marker identifier; and
generating, via said synchronization function, said first timing information upon receipt of said first marker notification.

7. The method according to claim 1, wherein said one or more markers are transmitted in one or more signaling messages associated with at least one of said first media stream or said second media stream.

8. The method according to claim 7, wherein said one or more signaling messages comprises at least one of a RTP timestamp, a NTP timestamp, or a PTS type timestamp.

9. The method according to claim 1, wherein said first marked content part and said second marked content part are a first segment and a second segment of a first segmented media stream and a second segmented media stream respectively, each of said first and second segments being identified in a manifest file data structure by a segment identifier.

10. The method according to claim 9 wherein said manifest file data structure further comprises location information associated with said segment identifiers for locating one or more media servers configured to transmit segments identified by said segment identifiers, and, marker information comprising at least one marker, said at least one marker being associated with said segment identifier comprised in said manifest file data structure.

11. A receiver, comprising a synchronization client configured to receive at least a media stream associated with at least one marker for marking a content part of said media stream, said synchronization client being configured for:
using a marker to detect at least one marked content part of said media stream;
responsive to the detection using the marker, providing a synchronization function with timing information associated with said detected first marker; and
receiving synchronization information from said synchronization function, said synchronization information configured for instructing said synchronization client to adjust the processing of said media stream,
wherein said synchronization function is configured to:
receive or provide first timing information associated with a first receiver, said first receiver comprising a first synchronization client, said first timing information being associated with a first marked content part of a first media stream being received by said first receiver;
receive or provide second timing information associated with a second receiver, said second receiver comprising a second synchronization client, said second timing information being associated with a second marked content part of a second media stream being received by said second receiver;
determine a timing difference based on said first and second timing information; and
generate, on the basis of said timing difference, said synchronization information for instructing at least one of said first synchronization client or said second synchronization client to adjust the processing of said first media stream or said second media stream respectively,
wherein the first media stream and the second media stream are transmitted by one or more content sources as marked streams associated with one or more markers for marking the first marked content part and the second marked content part of said first media stream and said second media stream respectively.

12. A device comprising a synchronization function, wherein one or more content sources transmit a first media stream and a second media stream each with a plurality of markers, wherein the plurality of markers comprise a first marker identifier and a second marker identifier, wherein each marker marks a respective one of a plurality of content parts of said first media stream and said second media stream, said synchronization function being configured for:
receiving first timing information associated with a first receiver, said first receiver comprising a first synchronization client, said first timing information being associated with a first marked content part of the first media stream detected by said first receiver, and comprising the first marker identifier and a first clock time, wherein responsive to the first receiver detecting the first marker, the first receiver associates the first timing information with said first marked content part;
receiving second timing information associated with a second receiver, said second receiver comprising a second synchronization client, said second timing information being associated with a second marked content part of the second media stream detected by said second receiver, and comprising the second marker identifier and a second clock time, wherein responsive to the second receiver detecting the second marker, the second receiver associates the second timing information with said second marked content part;

determining a timing difference based on said first and second timing information, said determining comprising comparing said first marker identifier to said second marker identifier; and, generating on the basis of said timing difference synchronization information for instructing at least one of said first synchronization client or said second synchronization client to adjust the processing of said first media stream or said second media stream respectively.

13. A system for enabling inter-destination synchronization of processing of content of at least a first media stream and a second media stream, wherein one or more content sources transmit the first media stream and the second media stream as marked streams associated with one or more markers for marking one or more content parts of said first media stream and said second media stream respectively, said system comprising:

a first receiver, comprising a first synchronization client configured for:
using a first marker to detect a first marked content part of the first media stream,
responsive to the detection using the first marker, associating said first marked content part with first timing information, and
transmitting at least one of said first timing information to a device comprising a synchronization function or transmitting a first marker notification to said synchronization function;

a second receiver, comprising a second synchronization client configured for:
using a second marker to detect a second marked content part of the second media stream,
responsive to the detection using the second marker, associating said second marked content with second timing information, and
at least one of transmitting said second timing information to said device comprising said synchronization function or transmitting a second marker notification to said synchronization function; and said device comprising a synchronization function configured for:
receiving said first and/or second timing information and/or deriving said first and/or second timing information from said received first and/or second marker notification;
determining a timing difference based on said first timing information and second timing information; and
generating on the basis of said timing difference synchronization information for said first and/or second synchronization client to adjust the processing of said first and/or second media stream respectively.

14. A computer program product, implemented on computer-readable non-transitory storage medium, the computer program product configured for, when run on a computer, executing the method steps according to claim 1.

15. The method according to claim 1 wherein said first and second marker are the same or relate to the same position on a content time-line common to the first media stream and the second media stream.

16. The receiver according to claim 11, wherein said timing information comprises at least one of a first clock time or a marker identifier.

17. The device of claim 12, wherein the plurality of markers are periodically introduced into each of the first media stream and the second media stream.

18. The device of claim 12, wherein a value of each marker identifier increases over time in the first media stream and the second media stream.

* * * * *